(12) United States Patent
O'Hagan et al.

(10) Patent No.: US 8,784,959 B2
(45) Date of Patent: Jul. 22, 2014

(54) INJECTION-MOLDED COMPOSITE CONSTRUCT

(75) Inventors: Brian R. O'Hagan, Appleton, WI (US); Peter W. Blaas, Marion, WI (US); Scott W. Middleton, Oshkosh, WI (US); Kevin J. Hjort, Clintonville, WI (US); Bruce Barnard, Brillion, WI (US)

(73) Assignee: Graphic Packaging International, Inc., Atlanta, GA (US)

(*) Notice: Subject to any disclaimer, the term of this patent is extended or adjusted under 35 U.S.C. 154(b) by 0 days.

(21) Appl. No.: 13/357,295

(22) Filed: Jan. 24, 2012

(65) Prior Publication Data

US 2012/0118900 A1 May 17, 2012

Related U.S. Application Data

(62) Division of application No. 11/715,718, filed on Mar. 8, 2007, now Pat. No. 8,124,201.

(60) Provisional application No. 60/781,229, filed on Mar. 10, 2006, provisional application No. 60/834,402, filed on Jul. 31, 2006.

(51) Int. Cl.
- *B65D 5/28* (2006.01)
- *B32B 1/02* (2006.01)
- *B29C 65/00* (2006.01)
- *B32B 27/10* (2006.01)

(52) U.S. Cl.
USPC ........ 428/35.7; 428/34.2; 428/542.8; 220/62; 264/241

(58) Field of Classification Search
USPC .............. 428/34.2, 35.7, 542.8; 220/62, 62.1; 229/406; 264/241
See application file for complete search history.

(56) References Cited

U.S. PATENT DOCUMENTS

| | | | |
|---|---|---|---|
| 2,328,563 A | 9/1943 | Lichter | |
| 2,522,397 A | 9/1950 | Palmer | |
| 2,607,080 A | 8/1952 | Stewart | |
| 2,634,880 A | 4/1953 | Gravatt | |
| 2,937,949 A | * 5/1960 | Loevenbruck | ................ 426/118 |
| 3,040,949 A | 6/1962 | Foote | |
| 3,099,377 A | 7/1963 | Metzler et al. | |
| 3,119,540 A | 1/1964 | Scenk et al. | |
| 3,135,455 A | 6/1964 | Santangelo | |
| 3,144,167 A | 8/1964 | Schultz | |
| 3,154,617 A | 10/1964 | Schenk et al. | |

(Continued)

FOREIGN PATENT DOCUMENTS

| | | |
|---|---|---|
| EP | 0 082 209 A2 | 6/1983 |
| EP | 0 156 000 A2 | 10/1985 |

(Continued)

OTHER PUBLICATIONS

Supplementary European Search Report for EP 09 75 5313 dated Jan. 25, 2012.

(Continued)

*Primary Examiner* — Erik Kashnikow

(74) *Attorney, Agent, or Firm* — Womble Carlyle Sandridge & Rice, LLP

(57) ABSTRACT

A frame is injection molded onto a group of panels to form a container. The panels extend at least partially around, and at least partially define, a cavity of the container.

17 Claims, 20 Drawing Sheets

(56) References Cited

U.S. PATENT DOCUMENTS

| | | | |
|---|---|---|---|
| 3,190,530 A | 6/1965 | Edwards | |
| 3,226,008 A | 12/1965 | Chiorri | |
| 3,286,876 A | 11/1966 | Ring | |
| 3,511,902 A | 5/1970 | Santangelo | |
| 3,680,733 A | 8/1972 | Winslow | |
| 3,684,633 A | 8/1972 | Haase | |
| 3,765,976 A | 10/1973 | Nasica | |
| 3,785,544 A | 1/1974 | Smith | |
| 3,834,606 A | 9/1974 | Andersson | |
| 3,967,731 A | 7/1976 | Boduch | |
| 3,973,689 A | 8/1976 | Sutch | |
| 4,001,471 A | 1/1977 | Rumball | |
| 4,079,851 A | 3/1978 | Valyi | |
| 4,123,214 A | 10/1978 | Sutch | |
| 4,139,115 A | 2/1979 | Robinson | |
| 4,149,838 A | 4/1979 | Sutch | |
| 4,183,435 A | 1/1980 | Thompson et al. | |
| 4,312,451 A | 1/1982 | Forbes, Jr. | |
| 4,404,162 A | 9/1983 | Miki et al. | |
| 4,489,120 A | 12/1984 | Hollinger, Jr. | |
| 4,533,065 A | 8/1985 | Chazal et al. | |
| 4,533,312 A | 8/1985 | Von Holdt | |
| 4,606,496 A | 8/1986 | Marx et al. | |
| 4,609,140 A | 9/1986 | Van Handel et al. | |
| 4,624,380 A | 11/1986 | Wernette | |
| 4,704,510 A | 11/1987 | Matsui | |
| 4,721,499 A | 1/1988 | Marx et al. | |
| 4,775,771 A | 10/1988 | Pawlowski et al. | |
| 4,865,921 A | 9/1989 | Hollenberg et al. | |
| 4,890,439 A | 1/1990 | Smart et al. | |
| 4,935,089 A | 6/1990 | Schirmer | |
| 4,936,935 A | 6/1990 | Beckett | |
| 4,963,424 A | 10/1990 | Beckett | |
| 4,971,201 A | 11/1990 | Sathre | |
| 5,039,364 A | 8/1991 | Beckett et al. | |
| 5,117,078 A | 5/1992 | Beckett | |
| 5,183,706 A | 2/1993 | Bekele | |
| 5,190,209 A | 3/1993 | Gordon et al. | |
| 5,213,902 A | 5/1993 | Beckett | |
| 5,219,461 A | 6/1993 | Hyll et al. | |
| 5,221,419 A | 6/1993 | Beckett | |
| 5,260,537 A | 11/1993 | Beckett | |
| 5,266,386 A | 11/1993 | Beckett | |
| 5,269,717 A | 12/1993 | Tardif | |
| RE34,683 E | 8/1994 | Maynard et al. | |
| 5,335,847 A | 8/1994 | Lisiecki | |
| 5,340,436 A | 8/1994 | Beckett | |
| 5,354,973 A | 10/1994 | Beckett | |
| 5,410,135 A | 4/1995 | Pollart et al. | |
| 5,424,517 A | 6/1995 | Habeger, Jr. et al. | |
| 5,506,036 A | 4/1996 | Bergerious | |
| 5,519,195 A | 5/1996 | Keefer et al. | |
| 5,565,228 A * | 10/1996 | Gics | 426/107 |
| 5,628,921 A | 5/1997 | Beckett | |
| 5,672,407 A | 9/1997 | Beckett | |
| 5,758,773 A | 6/1998 | Clements | |
| 5,759,422 A | 6/1998 | Schmelzer et al. | |
| 5,800,724 A | 9/1998 | Habeger et al. | |
| 5,934,472 A | 8/1999 | Ramirez et al. | |
| 6,114,679 A | 9/2000 | Lai et al. | |
| 6,149,006 A | 11/2000 | Brauner et al. | |
| 6,150,646 A | 11/2000 | Lai et al. | |
| 6,204,492 B1 | 3/2001 | Zeng et al. | |
| 6,251,451 B1 | 6/2001 | Zeng | |
| 6,308,831 B1 | 10/2001 | Saxe et al. | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,547,127 B2 | 4/2003 | Bradford | |
| 6,552,315 B2 | 4/2003 | Zeng et al. | |
| 6,667,004 B2 | 12/2003 | Cha | |
| 6,677,563 B2 | 1/2004 | Lai | |
| 6,682,675 B1 | 1/2004 | Vandangeot et al. | |
| 6,682,676 B1 | 1/2004 | Renault et al. | |
| 6,717,121 B2 | 4/2004 | Zeng et al. | |
| 6,765,182 B2 | 7/2004 | Cole et al. | |
| 6,790,026 B2 | 9/2004 | Vandangeot et al. | |
| 6,823,624 B2 | 11/2004 | Proserpio | |
| 6,981,863 B2 | 1/2006 | Renault et al. | |
| 7,000,825 B2 | 2/2006 | Alexander et al. | |
| 7,019,271 B2 | 3/2006 | Wnek et al. | |
| 7,311,868 B2 | 12/2007 | Ek | |
| 7,323,669 B2 | 1/2008 | Robison et al. | |
| 7,351,942 B2 | 4/2008 | Wnek et al. | |
| 7,365,292 B2 | 4/2008 | Cole et al. | |
| 7,476,830 B2 | 1/2009 | Middleton et al. | |
| 7,541,562 B2 | 6/2009 | Cole et al. | |
| 2002/0092791 A1 | 7/2002 | Wnek | |
| 2003/0004003 A1 | 1/2003 | Lochtefeld | |
| 2003/0014912 A1 | 1/2003 | Proserpio | |
| 2004/0239005 A1 | 12/2004 | Ek | |
| 2004/0262322 A1 | 12/2004 | Middleton et al. | |
| 2005/0109653 A1 | 5/2005 | Wnek et al. | |
| 2006/0198972 A1 | 9/2006 | Ueda et al. | |
| 2007/0081743 A1 | 4/2007 | Kim | |
| 2007/0194029 A1 | 8/2007 | Middleton et al. | |
| 2007/0251943 A1 | 11/2007 | Wnek et al. | |
| 2007/0262487 A1 | 11/2007 | O'Hagan | |
| 2007/0267374 A1 | 11/2007 | Middleton et al. | |
| 2008/0000896 A1 | 1/2008 | Lafferty et al. | |
| 2008/0164178 A1 | 7/2008 | Wnek et al. | |
| 2009/0223952 A1 | 9/2009 | Wnek et al. | |
| 2009/0250372 A1 | 10/2009 | Wnek et al. | |

FOREIGN PATENT DOCUMENTS

| | | | |
|---|---|---|---|
| EP | 0 816 239 A1 | 1/1998 | |
| EP | 0844972 | 7/2002 | |
| EP | 1 332 972 A2 | 8/2003 | |
| FR | 1 006 970 | 4/1952 | |
| FR | 1288503 | 3/1962 | |
| FR | 2 677 915 | 12/1992 | |
| FR | 2 733 175 A1 | 11/1996 | |
| FR | 2 806 346 A1 | 9/2001 | |
| FR | 2 806 347 A1 | 9/2001 | |
| GB | 1 348 370 | 3/1974 | |
| GB | 1 487 825 | 10/1977 | |
| GB | 1 502 266 * | 3/1978 | B31B 1/60 |
| GB | 2 171 048 A | 8/1986 | |
| JP | 47-23456 | 10/1972 | |
| JP | 53-8574 | 3/1978 | |
| JP | 54-116059 | 9/1979 | |
| JP | 54-126887 | 9/1979 | |
| JP | 56-65866 U | 6/1981 | |
| JP | 59-75004 | 4/1984 | |
| JP | 60-96234 | 7/1985 | |
| JP | 03-004582 | 1/1991 | |
| JP | 3-57020 U | 5/1991 | |
| JP | 30-57020 U | 5/1991 | |
| JP | 60-00843 A | 1/1994 | |
| JP | 7-28833 | 5/1995 | |
| JP | 07-28833 | 5/1995 | |
| JP | 08-119271 | 5/1996 | |
| JP | 08-156944 | 6/1996 | |
| JP | 08-282647 | 10/1996 | |
| JP | 08-337235 | 12/1996 | |
| JP | 09-254948 | 9/1997 | |
| JP | 2000-043840 | 2/2000 | |
| JP | 2000-142825 | 5/2000 | |
| JP | 2000-238760 | 9/2000 | |
| JP | 2000-335550 | 12/2000 | |
| JP | 2001-213420 | 8/2001 | |
| JP | 2001-328617 | 11/2001 | |
| JP | 2006-513108 | 4/2006 | |
| JP | 2007111888 | 5/2007 | |
| KR | 1999023720 | 7/1999 | |
| KR | 100360299 | 11/2002 | |
| WO | WO 94/01276 | 1/1994 | |
| WO | WO 94/08777 | 4/1994 | |
| WO | WO 03/066435 A2 | 8/2003 | |
| WO | WO 03/078012 A1 | 9/2003 | |
| WO | WO 2004/033324 A1 | 4/2004 | |

(56) References Cited

FOREIGN PATENT DOCUMENTS

| WO | WO 2008/049048 A2 | 4/2008 |
| WO | WO 2009/086501 A2 | 7/2009 |
| WO | WO 2009/088904 A2 | 7/2009 |

OTHER PUBLICATIONS

Supplementary European Search Report for EP 08 86 8990 dated Jan. 25, 2012.
Supplementary European Search Report for EP 08 78 0950 dated Dec. 5, 2011.
International Search Report and Written Opinion for PCT/US2008/088605 mailed Jul. 27, 2009.
International Search Report and Written Opinion for PCT/US2008/088408 mailed Aug. 14, 2009.
PCT/US2007/005956—International Search Report.
PCT/US2007/005956—Written Opinion.
EP 03 77 6279—Supplementary European Search Report.
PCT/US2009/035986—International Search Report and Written Opinion.
Communication from EPO for EP Application No. EP 07 752 640.8 dated Jan. 3, 2010.
English translation of Office Action issued Jul. 4, 2011 in corresponding Japanese Patent Appl No. 2009-500389.

* cited by examiner

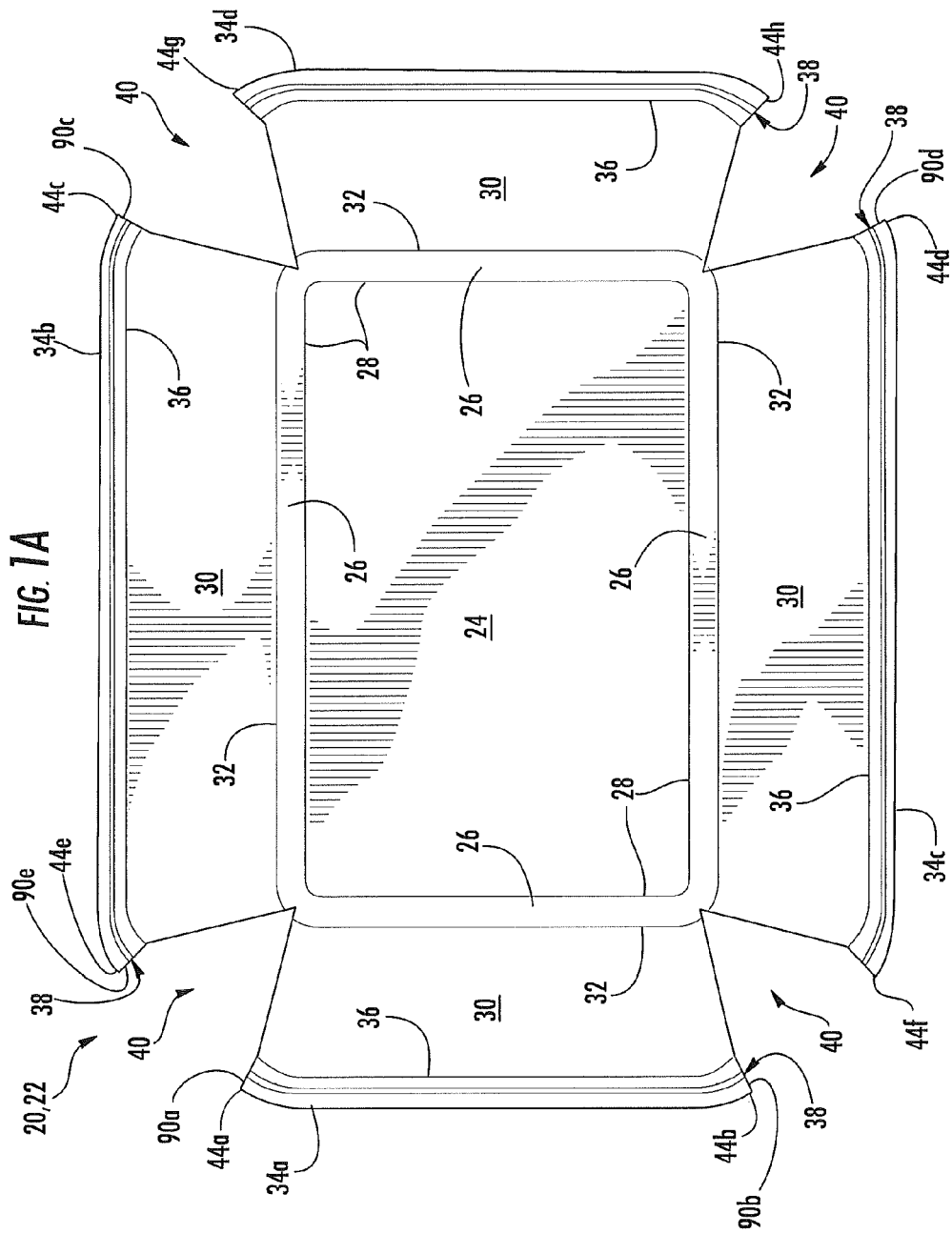

INJECTION-MOLDED COMPOSITE CONSTRUCT

CROSS-REFERENCE TO RELATED APPLICATIONS

The present application is a divisional of allowed U.S. patent application Ser. No. 11/715,718, filed Mar. 8, 2007, which claims the benefit of both U.S. Provisional Patent Application No. 60/781,229, filed Mar. 10, 2006, and U.S. Provisional Patent Application No. 60/834,402, filed Jul. 31, 2006. The entire disclosures of all of the above-referenced patent applications are incorporated herein by reference.

BACKGROUND OF THE INVENTION

The present invention generally relates to composite constructs and, more particularly, the present invention relates to cartons with injection-molded features.

A variety of constructs that are in the form of containers are known. There is always a desire for containers that provide a new balance of properties. For example, there is always a desire for improvements relating to a container that is lightweight, stiff (even when containing hot food), leakproof and cost-effective.

BRIEF SUMMARY OF SOME ASPECTS OF THE INVENTION

An aspect of the present invention is the provision of a construct, such as a container or more specifically a tray, that can advantageously be both lightweight and stiff (even when containing hot food), and that is cost-effective to produce. The container can also be leakproof. In accordance with one example of the present invention, the container includes a group of panels that is supported by a frame. The panels can be at least partially formed from paperboard, and the frame can be at least partially formed from polymeric material, so that the frame can be distinct from the panels.

In accordance with one acceptable method, the frame can be injection molded at least partially onto and/or around the group of panels. More specifically, the group of panels can be arranged in a predetermined configuration, so that the group of panels extends at least partially around, and at least partially defines, at least one cavity of the container. The frame can be mounted to (e.g., molded onto) at least portions of some of the panels, so that the frame holds the group of panels in the predetermined configuration.

In accordance with one example of the present invention, corners of the container are at least partially defined by some of the panels, and the frame advantageously extends into and seals the corners so that that the container is substantially leakproof. The panels can be part of a web that includes paperboard and a polymer film that is carried by the paperboard. The polymer film and a polymer from which the frame is constructed can be selected so that they firmly adhere to one another, such as during an injection-molding process. This firm adhesion between the polymer film and the frame can advantageously enhance the leakproofness of the container. If desired, the leakproofness can advantageously be enhanced by forming the corners of the container so that the panels remain at least substantially unpleated proximate the corners.

Optionally, microwave energy interactive material can be positioned between the paperboard and the polymer film carried by the paperboard, or a web of microwave energy interactive material can be placed over the polymer film, or a microwave energy interactive material can be associated with the container by way of other means. The microwave energy interactive material can enhance the cooking, heating, browning and/or crisping of a food item that is contained by the container while the container is in a microwave oven.

An aspect of the present invention relates to providing a construct by disposing a substrate into a mold, and then injecting a molding material, such as but not limited to polymeric material, into the mold so that the molding material becomes fixedly attached to the substrate. For example and not limitation, the substrate can be paperboard, cardboard, paper, a sheet of polymeric material, or a laminate that includes one or more of these materials.

Another aspect of the present invention relates to closing a blank in a forming tool (e.g., mold) so that the blank is at least partially erected during the closing of the mold, and then injecting a molding material, such as but not limited to polymeric material, into the closed mold so that the molding material becomes fixedly attached to the erected blank. The solidified molding material that is fixedly attached to the erected blank can be in the form of a frame that at least partially holds the erected blank in its erected configuration. The frame together with the erected blank can be characterized as an injection-molded composite construct. For example and not limitation, throughout this disclosure, a construct can be characterized as being (e.g., can be shaped to function as) a blank, container, carton, sleeve, tray, or the like.

In accordance with one aspect of the present invention, when the molding material is injected into the mold, the molding material forces predetermined portions of the blank against the forming tool (e.g., mold) and thereby forms, or at least enlarges, channels. The molding material flows in, and solidifies in, these channels.

Another aspect of the present invention relates to reinforcing an injection-molded construct. In one example, the injection-molded construct is formed from a polymeric material, and it is reinforced with paperboard, or the like.

In accordance with one aspect of the present invention, a container includes panels that extends at least partially around and at least partially define a cavity of the container. These panels include a base panel, a first side panel extending upwardly from the base panel, and a second side panel extending upwardly from the base panel. Edges of the first and second side panels extend along the same elongate corner of the container such that a gap is defined between the edges of the first and second side panels. In addition, an overlap exists between the edges of the first and second side panels. An injection-molded structure extends along and at least partially defines the corner of the container. The injection-molded structure obstructs the gap and at least partially covers the overlap. This can advantageously both strengthen and seal the container.

According to one aspect of the present invention, a container includes a base panel and side panels that extend upwardly from the base panel. The side panels extend at least partially around and at least partially define a cavity of the container. Multi-part flanges extend outwardly from upper edges of side panels. Each multi-part flange typically includes a lower flange that extends outwardly from the upper edge of the respective side panel, an upright panel that extends upright from an outer edge of the lower flange, and optionally also an upper flange that extends outwardly from an upper edge of the upright panel. The upright panel can extend vertically or be inclined with respect to the vertical, and typically it is inclined outwardly (e.g., slightly outwardly). A band is injection-molded onto upper surfaces of both the upper and lower flanges. The force of the injecting of the molding material can at least partially bend/form the flanges, such as by forcing them against a surface of a mold, so that the flanges take on the shape of the subject surface of the mold. The band can advantageously strengthen the flanges and provide a smooth surface for sealing with a lid, cover, or the like. Typically, the band is thicker above the lower flange than it is above the upper flange, such that the lower flange advantageously partially defines a relatively large channel for having molding material flow therein during the injection molding.

According to one aspect of the present invention, a panel at least partially defines an elongate corner of the container. The panel includes a curved portion, and an outward surface of the curved portion of the panel defines an outwardly projecting protrusion of the panel. The outwardly projecting protrusion of the panel is elongate and extends along the corner (e.g., to define a rib). An inward surface of the curved portion of the panel defines a recess that is elongate and extends along the corner. An injection-molded strip extends along and at least partially defines the corner of the container. The strip includes an outwardly projecting protrusion that is elongate, extends along the corner, and extends into the recess of the curved portion of the panel. Advantageously, this arrangement can help to strengthen the container and help to provide a smooth interior surface of the container. Also advantageously, the rib-like protrusions of the panels define relatively large channels for accommodating flowing molding material during the injection molding. Also, the rib-like protrusions of the panels can be formed by the injected molding material forcing respective portions of the panels against respective surfaces of a mold, so that the respective portions of the panels bend and take on the shape of the respective surfaces of the mold.

In one aspect of the present invention, a container includes an elongate corner, and panels of the container include a curved portion. An outward surface of the curved portion defines an outwardly bulbous portion (e.g., protrusion) of the panels. An inward surface of the curved portion defines a substantially bowl-shaped recess. An injection-molded strip, which extends along and at least partially defines the corner of the container, includes an outwardly bulbous portion that extends into the substantially bowl-shaped recess. The outwardly bulbous portion of the panels and the outwardly bulbous portion of the strip are positioned at a lower end of the corner. Advantageously, this arrangement can help to strengthen the container and help to provide a smooth interior surface of the container. Also advantageously, the bulbous protrusions of the panels define relatively large channels for accommodating the flowing molding material during injection molding. Also, the bulbous protrusions of the panels can be formed by the injected molding material forcing respective portions of the panels against respective surfaces of a mold, so that the respective portions of the panels bend and take on the shape of the respective surfaces of the mold.

In accordance with one aspect of the present invention, a blank includes a base panel and flaps that are respectively connected to and extend outwardly from the base panel. A gap is defined between a first of the flaps and a second of the flaps. At least an inner portion of the gap becomes wider farther from the base panel. The first and/or the second flap has a protruding feature that has a reducing effect on how the width of the gap changes as a function of increased distance outwardly from the base panel. These protruding features may overlap in a construct erected from the blank. Advantageously, the overlap can strengthen the construct and/or the overlap can help to control the flow of the molding material during the injection molding.

In accordance with one aspect of the present invention, a construct includes a laminate including a releasable adhesive positioned between and at least indirectly joining together a substrate and a polymer film. At least one injection-molded feature is at least indirectly joined to the polymer film. Advantageously, the construct may be readily separated into separate parts (one or both of which may be recycled). The separating can include separating the substrate and the polymer film from one another so that the injection-molded feature remains at least indirectly joined to the polymer film.

One aspect of the present invention is the provision of an apparatus for use in at least partially forming a container. The apparatus includes a mold having a cavity with an elongate interior corner that extends into the cavity. The interior corner includes an elongate central region positioned between elongate recesses. Advantageously, this configuration can help in the formation of containers in the mold, such as containers with ribbed corners, as discussed above. In addition or alternatively, the mold can be configured to help provide the above-discussed bulbous portions.

In accordance with one aspect of the present invention, a female mold includes a cavity having a plurality of elongate interior corners that extend into the cavity, and a male mold is provided for being inserted into the cavity of the female mold. The male mold includes an outer mold and an inner mold that is movably mounted to the male outer mold for moving between an extended configuration and a retracted configuration. The male outer mold includes corners that extend at least partially around the male inner mold while the male inner mold is in the retracted configuration. The corners of the male outer mold are for being respectively positioned in the interior corners of the cavity of the female mold when the male mold is inserted into the cavity of the female mold, so that the plurality of corners of the male outer mold are respectively positioned between the interior corners of the female mold and the male inner mold while the male mold is inserted into the cavity of the female mold. Advantageously, this can seek to eliminate the formation of parting lines.

In accordance with one example of a method of manufacturing, a blank is closed in a forming tool, so that the blank is formed into a construct that is at least partially contained in the closed forming tool. The forming tool includes a male mold and a female mold, and the closing of the blank in the forming tool includes engaging a first part (e.g., nose) of the male mold against a portion of the blank, thereafter using at least the first part of the male mold to at least partially force the portion of the blank into a cavity of the female mold and thereby partially form the construct, thereafter engaging a second part (e.g., base or outer part) of the male mold against a portion of the partially formed construct to further form the construct, and moving the first part of the male mold relative to the second part of the male at a period of time that occurs during the closing of the blank in the forming tool and is after the engaging of the first part of the male mold against the portion of the blank. This can advantageously allow the blank to be erected in stages.

In accordance with another example of a method of manufacturing, the forming of a construct within a forming tool includes arranging a first part of the construct and a second part of the construct so that there is an overlapping relationship between the first part and the second part, and an edge of the first part is positioned between the second part and a channel. Then an injection-molded feature is formed on the construct. The forming of the injection-molded feature includes forcing molding material into the channel, so that the molding material flows along the first part, then across the edge of the first part, and then along the second part. This can advantageously help to keep the molding material on the proper side of the construct.

Other aspects and advantages of the present invention will become apparent from the following.

BRIEF DESCRIPTION OF THE DRAWINGS

In the following, reference is made to the accompanying drawings that are listed below. The drawings illustrate exemplary embodiments of the present invention, and they are not necessarily drawn to scale.

FIG. 1A is a plan view of blank in a flat configuration, in accordance with a first exemplary embodiment of the present invention.

DETAILED DESCRIPTION OF EXEMPLARY EMBODIMENTS

In the following, exemplary embodiments of the present invention are described in greater detail with reference to the above-mentioned drawings, in which like numerals refer to like parts throughout the several views.

Figure 1B:
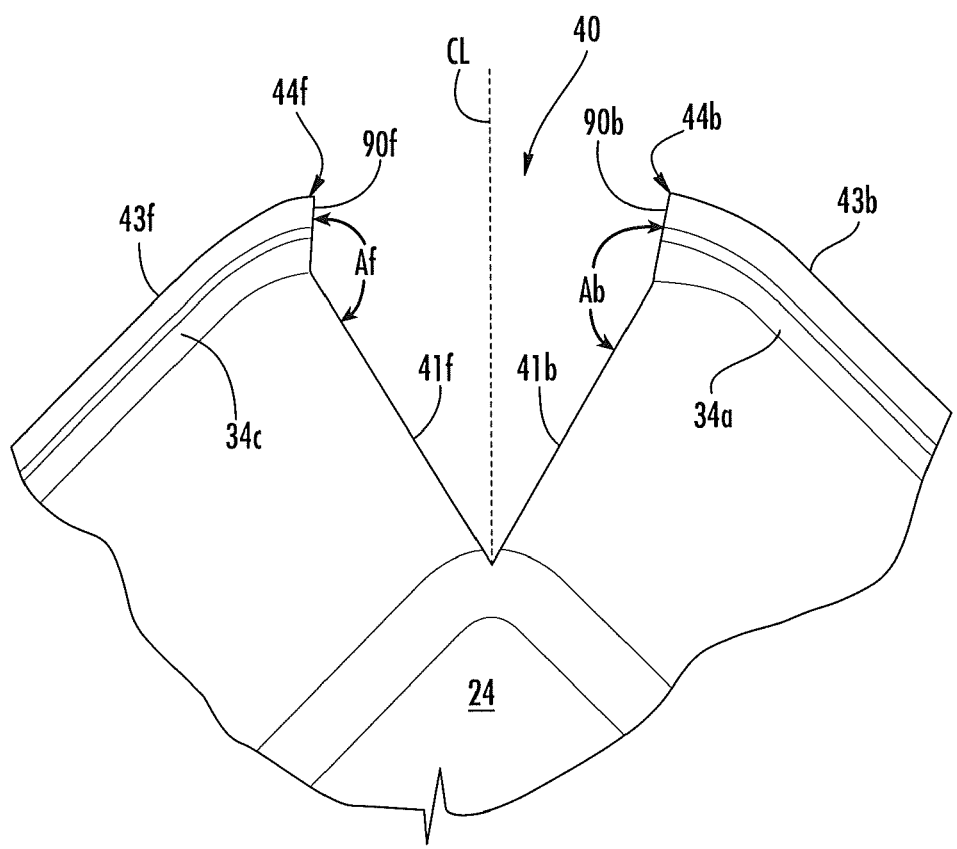
FIG. 1B is a plan view of a representative portion of the blank of FIG. 1A.
Figure 2A:
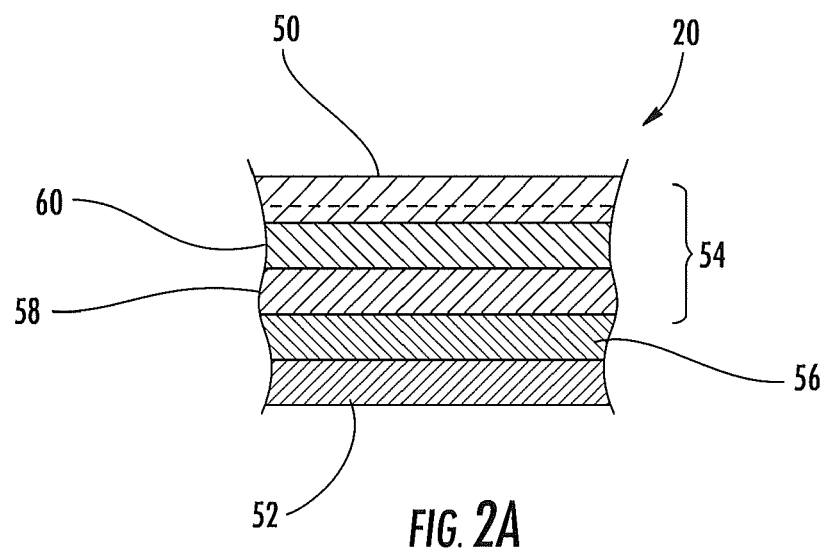
FIG. 2A is a schematic cross-sectional view of a laminate from which the blank of FIGS. 1A and 1B can be constructed.
Figure 2B:
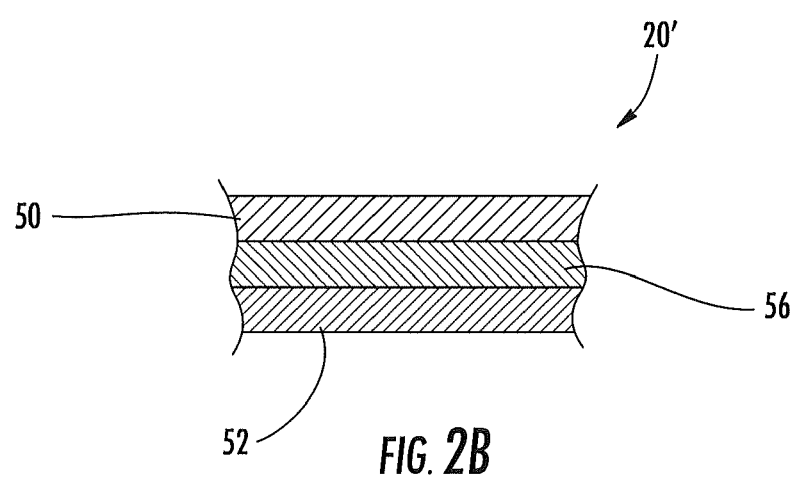
FIG. 2B is a schematic cross-sectional view of another laminate from which the blank of FIGS. 1A and 1B can be constructed.

FIG. 1 illustrates a construct, namely a blank 22, that can be formed (e.g., cut) from laminates, such as the laminates 20, 20' shown in FIGS. 2A and 2B, in accordance with a first exemplary embodiment of the present invention. As best understood with reference to FIG. 1, the blank 22 includes a base panel 24 that is connected to intermediate panels 26 by an inner fold line 28. The intermediate panels 26 are respectively connected to side panels 30, which can also be characterized as flaps, by intermediate fold lines 32. Flange portions 34a-34d are respectively connected to the side panels 30 by outer fold lines 36. Each of the flange portions 34a-34d includes a pair of closely adjacent fold lines 38. The flange portions 34a-34d can be characterized as being portions of the respective flaps/side panels 30. In one example, one or more of or all of the inner fold line 28, intermediate fold lines 32, outer fold lines 36, and closely adjacent fold lines 38 can be omitted from the blank 22, as will be discussed in greater detail below.

The blank 22 defines corner gaps 40, each of which is somewhat V-shaped. In accordance with the first embodiment, each of the corner gaps 40 and associated features are identical, except for orientation. That is and more specifically, each of the gaps 40 and associated structures are as shown in FIG. 1B, or a mirror image of what is shown in FIG. 1B. Other corner gap arrangements are also within the scope of the present invention.

FIG. 1B is an enlarged view of a portion of the blank 22 that includes a representative one of the corner gaps 40. The representative corner gap is defined by opposed, outwardly extending inner edges 41f, 41b, and opposed, outwardly extending end edges 90f, 90b (e.g., end edges of the flange portions 34c, 34a) that respectively extend from the inner edges. The end edges 90f, 90b respectively in conjunction with end sections of outer edges 43f, 43b define protruding features 44f, 44b. An inner portion of the representative corner gap 40 is defined between the inner edges 41f, 41b so that the inner portion of the gap becomes wider farther from the base panel 24. The end edges 90f, 90b/protruding features 44f, 44b have a reducing effect on how width of the gap 40 changes as a function of increased distance outwardly from the base panel 24.

Angles Af, Ab are respectively defined between the inner edges 41f, 41b and the end edges 90f, 90b. The angles Af, Ab are less than 180 degrees so that that angles at least partially provide the reducing effect on how the width of the gap 40 changes as a function of distance outwardly from the base panel 24. As shown in the figures, the angles Af, Ab are obtuse angles. As alluded to above and in accordance with the first embodiment, the angles Af, Ab play a role in causing the width of the outer portion of the gap 40 to change at a lesser rate, as a function of distance outwardly from the base panel 24, than the width of the inner portion of the gap. Also, the angles Af, Ab can be different. For example, in the first embodiment the angle Af is smaller than the angle Ab so that, with respect to extending outwardly from the base panel 24, the end edge 90f extends convergently with respect to the centerline CL of the gap 40, whereas the end edge 90b extends divergently with respect to the centerline of the gap. For each of the outer edges 43f, 43b, each of its end sections extend obliquely with respect to its middle section. Other angles and arrangements for defining the gaps 40 and protruding features 44f, 44b are also within the scope of the present invention. In an alternative embodiment of the present invention, the protruding features 44f, 44b are omitted.

As mentioned above, in the first embodiment the angle Af is smaller than the angle Ab. At least partially as a result of this difference in the angles Ab and Af, the protruding feature 44f of the flange portion 34c is longer than the protruding feature 44b of the flange portion 34a (e.g., the protruding feature 44f extends farther into the respective gap 40 than the protruding feature 44b). Similarly and as best understood with reference to FIG. 1: the protruding feature 44e of the flange portion 34b is longer than the protruding feature 44a of the flange portion 34a, the protruding feature 44g of the flange portion 34d is longer than the protruding feature 44c of the flange portion 34b, and the protruding feature 44h of the flange portion 34d is longer than the protruding feature 44d of the flange portion 34c. These differences in the protruding features 44a-44h can be advantageously utilized, for example, when the blank 22 is erected, as will be discussed in greater detail below.

As best understood with reference to FIG. 2A, a laminate 20 from which the blank 22 can be formed includes more than one layer, but alternatively the laminate can be replaced with a single ply of material, such as, but not limited to, paperboard, cardboard, paper or a polymeric sheet. In accordance with the exemplary embodiments of the present invention, the laminate 20 includes a polymer film 50 that is supported by, and secured to, a substrate that can be in the form of cardboard, paperboard 52 or any other suitable material. Alternatively, the paperboard 52 and polymer film 50 can be replaced with any other suitable materials, for example such that the substrate of the present invention is not limited to paperboard or the like. Nonetheless and in accordance with the exemplary embodiments, the substrate typically is a clay-coated paperboard 52. As should be apparent, the paperboard 52 can be more generally characterized as a substrate, and a suitable substrate can include paperboard with or without typical supplemental materials, such as coatings that can include clay coatings, colorants, indicia and the like.

Optionally, and as shown in FIG. 2A, the polymer film 50 can be part of a microwave interactive web 54 that is secured to the paperboard 52 by a layer of adhesive material 56. The web 54 can further include one or more layers of microwave energy interactive material 58 that are secured to the polymer film 50 by one or more layers of adhesive material 60 or by any other suitable means. The microwave energy interactive material 58 can be incorporated in the laminate 20/blank 22 to enhance or otherwise control the cooking and/or heating of a food item that is contained by a container (e.g., tray 70 of FIG. 3) that is formed from the blank 22 and exposed to microwave energy. The optional web 54/microwave energy interactive material 58 will be discussed in greater detail below.

Figure 3:
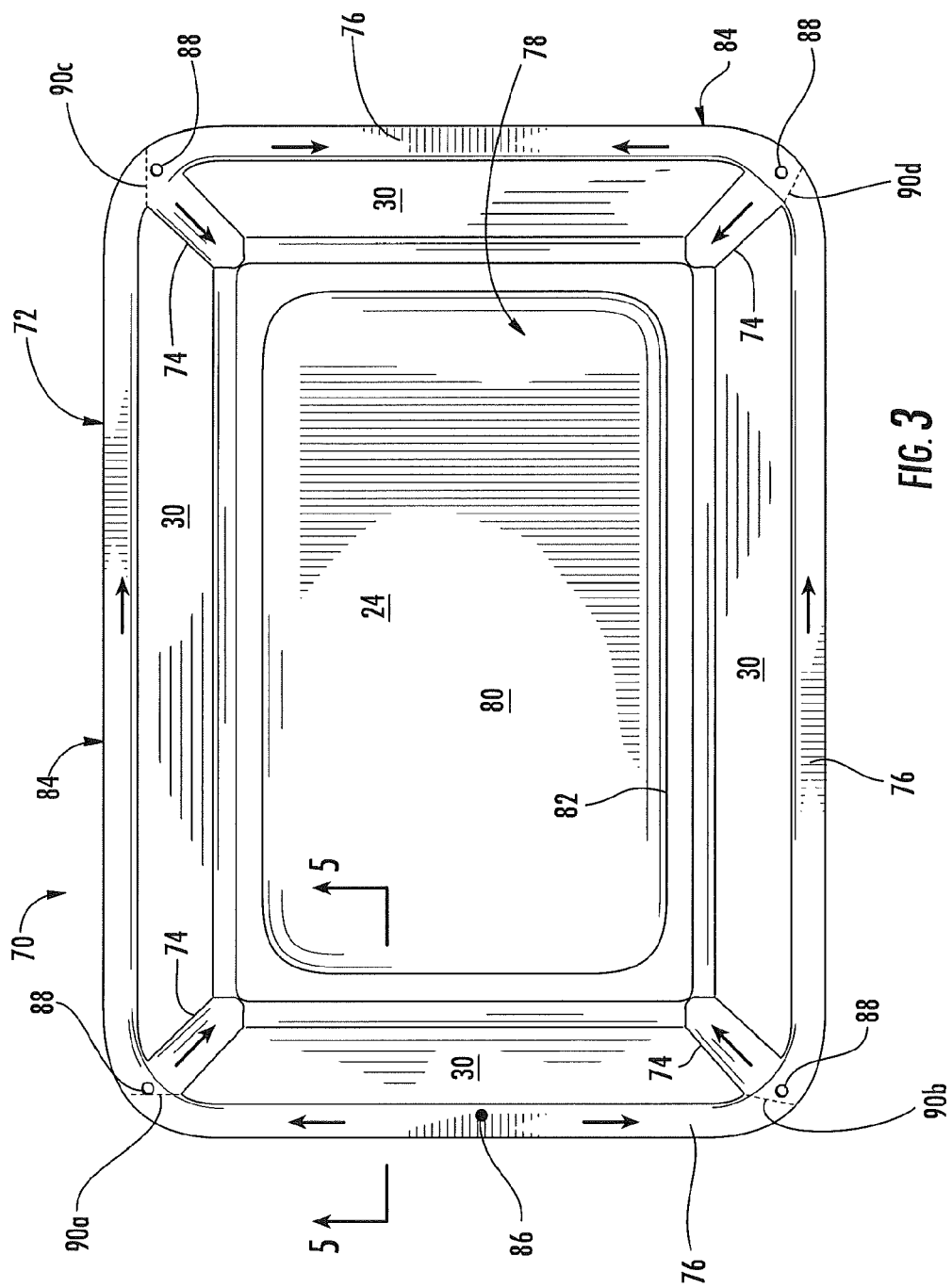
FIG. 3 is a schematic, top plan view of a tray, wherein the tray is constructed from the blank of FIG. 1A and a frame, in accordance with the first embodiment.

Although the polymer film 50 is described above as being part of the web 54, it is also within the scope of the present invention for the polymer film 50 to be adhered directly to the paperboard 54 by way of the layer of adhesive material 56 or by any other acceptable means, such that the one or more layers of microwave energy interactive material 58 and associated adhesive materials 56, 58 are omitted. For example, the film 50 can be extruded directly onto the paperboard 52 (i.e., via an extrusion coating process). In addition, the film 50 can be a coextruded film, as schematically illustrated by the dashed line that is shown as dividing the film 50 in FIG. 2A. A variety of different types of coextrusions with differing numbers of layers and having layers with different characteristics are within the scope of the present invention. For example, the various layers of the coextrusion can exhibit a wide variety of different properties such as, but not limited to, properties related to limiting oxygen and moisture transmission. Similarly, various markings (e.g., pictures and/or text) and/or colors can be incorporated into, or deposited on, the film 50 or any other portion of the blank 22 (FIG. 1) or tray 70 (FIG. 3).

If the microwave energy interactive material 58 is omitted, the container (e.g., tray 70 of FIG. 3) formed from the blank 22 can be transparent to microwave energy. Nonetheless, such a container that is transparent to microwave energy can still be used in a microwave oven, and it may also be used in a conventional oven. If a container formed from the blank 22 is to be used in a conventional oven at high temperatures, the materials from which the container is formed (e.g., the materials from which the blank 22 is formed) would typically be selected so that they sufficiently withstand the high temperatures.

As should be apparent from the foregoing, a wide variety of laminates, from which the blank 22 can be formed, are within the scope of the present invention. For example and as described above and shown in FIG. 2B, in a laminate 20' from which the blank 22 can be formed, the laminate 20' can include the layer of adhesive material 56 positioned between and joining (either directly or indirectly) the polymer film 50 (which can be in the form of one or more layers of polymer film, or the like) to the substrate (e.g., paperboard 52). As discussed above and as will be discussed in greater detail below, microwave energy interactive material 58 can optionally be associated with the polymer film 50.

Typically any web 54/microwave energy interactive material 58 is part of the laminate 20 before the blank 22 is cut from the laminate, or the web 54/microwave energy interactive material 58 is fixed to the blank 22 after the blank has been cut from the laminate 20'. Alternatively, the microwave interactive web 54/microwave energy interactive material 58 can be applied to or otherwise mounted to an already erected container (e.g., the tray 70 of FIG. 3). As one specific example, the microwave interactive web can be mounted (e.g., by way of an adhesive material, heat seal coating or any other suitable means) to interior surface(s) of the previously formed tray 70. In this regard, incorporated herein by reference is the entire disclosure of U.S. patent application Ser. No. 11/715,556, filed Mar. 8, 2007.

In accordance with one example of the exemplary embodiments, the adhesive material 56 provides a bond with such a high peel strength that the polymer film 50, or more generally the web 54 (FIG. 2A), cannot be separated from (e.g., peeled or stripped off of) the paperboard 52 without pulling fibers, or groups of fibers, from the paperboard 52. In contrast and accordance with another example of the exemplary embodiments, the adhesive material 56 is a releasable adhesive material that provides a bond with a lower peel strength, so that the polymer film 50, or more generally the web 54 (FIG. 2A), can be more easily separated from (e.g., peeled or stripped off of) the paperboard 52, such as without pulling fibers, or groups of fibers, (e.g., without pulling a substantial amount of fibers) from the paperboard 52. Peel strength is discussed in ASTM D903-98 (2004) entitled "Standard Test Method for Peel or Stripping Strength of Adhesive Bonds".

Figure 4:
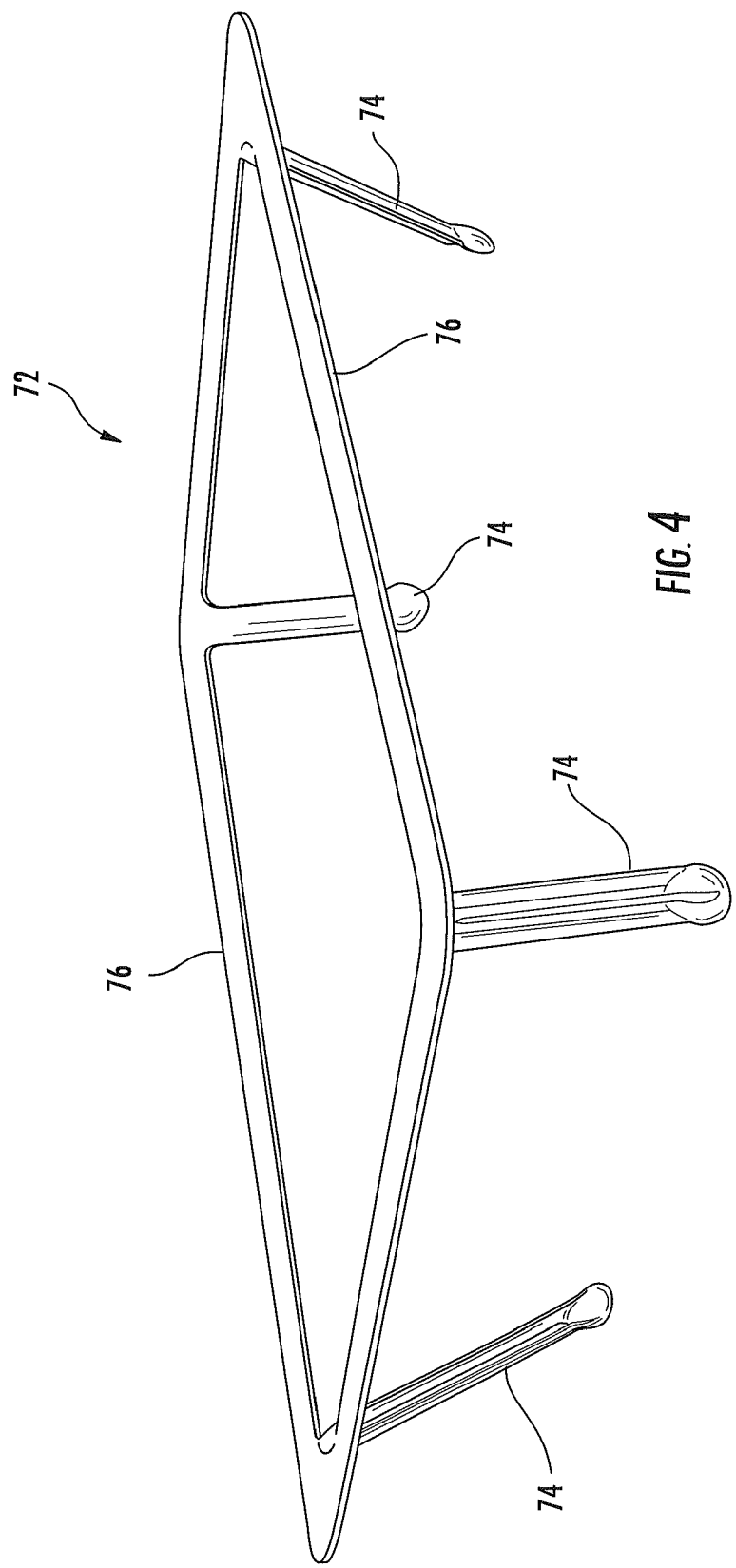
FIG. 4 is a schematic, isolated perspective view of the frame of the tray of FIG. 3.

Typically, the adhesive material 56 will be selected/applied in a manner so that it provides a peel strength that is sufficiently strong so that the polymer film 50/web 54 does not inadvertently become separated from the paperboard 52 at an undesirable time. In accordance with one acceptable method of the exemplary embodiments, it is not desirable for the polymer film 50/web 54 to separated from the paperboard 52 until after a user has finished using a construct (e.g., the tray 70 of FIG. 3) that is at least partially formed from the laminate 20 or 20', such as for cooking food therein. For example and in accordance with one acceptable method that can facilitate recycling of materials, when the tray 70 includes the adhesive material 56 that is in the form of a releasable adhesive, a user can manually separate (e.g., separate by the use of his or her hands) the tray 70 by separating the paperboard 52 from the polymer film 50/web 54. Typically an injection-molded feature, which can be in the form of a polymeric frame 72 schematically shown in isolation in FIG. 4, is adhered solely to the polymer film 50/web 54 and will remain adhered to the polymer film 50/web 54, such that the adhesive bond between the 72 polymeric frame and the polymer film 50/web 54 has a greater peel strength than the adhesive bond provided by the adhesive material 56 (e.g., between the paperboard 52 and polymer film 50/web 54).

Typically a releasable adhesive material 56 will be selected that will provide for substantially clean separation between the paperboard 52 and polymer film 50/web 54, so that the separated paperboard 52 does not include any of, or significant remnants of, the polymer film 50/web 54, and the separated polymer film 50/web 54 does not include any of, or significant remnants of, the paperboard 52. In accordance with one example, the separated paperboard 52 and/or the separated polymer film 50/web 54 (typically along with the polymeric frame 72 or the like still adhered thereto) are recycled. Therefore, and in accordance with this example, the separated part not including "any of, or significant remnants of," the other separated part means that the separated parts are sufficiently clean after separation so that they can be recycled in a conventional manner, without any more than the typical sorting and/or washing that is typically required for post-consumer recycling. Recycling typically involves breaking something down and making it suitable for reuse.

In addition or alternatively, for facilitating the releasing of the adhesive material 56 if desired, a release coating can be positioned between the adhesive material 56 and the paperboard 52 and/or polymer film 50/web 54, so that the release coating in combination with the adhesive material 56 enables separating the paperboard 52 and polymer film 50/web 54. In one example, such a release coating together with the adhesive material 56 can be cooperative so that the adhesive material 56 (e.g., such as an adhesive material that is not typically releasable without the release coating) can be referred to as a releasable adhesive.

The adhesive material 56 and the above-discussed optional release coating that can be cooperative with the adhesive material 56 can both be selected from a wide variety of commercially available materials. For example and as discussed above, the adhesive material 56 can "in and of itself" be a releasable adhesive material, such as a pressure sensitive releasable adhesive material, a polar adhesive polymer that is releasable (e.g., is not too polar), or the like or any combination thereof. In one example, an acceptable adhesive material 56 may be Royal 20164 or 20113 brand adhesive material, which is available from Royal Adhesives and Sealants LLC of South Bend, Ind. If necessary or desired, those adhesive materials or other adhesive materials may be used after the application of a board primer. An acceptable board primer may be Royal 20069 brand primer, which is also available from Royal Adhesives and Sealants LLC.

In one example, the adhesive material 56 is a soluble adhesive (e.g., a water-soluble adhesive), so that the tray 70 (FIG. 3), or the like, may be recycled by placing it in a bath that includes the appropriate solvent (e.g., water) and optionally agitating, heating and/or otherwise processing the bath to separate the paperboard 52 and polymer film 50/web 54. In one specific example in which the adhesive material 56 is a soluble adhesive, such as a water-soluble adhesive, the separating may occur in a paper recycling plant, where the polymer film 50/web 54/polymeric material may be separated from the paperboard 52/pulp by way of a bath that contains water and is processed in a suitable manner. The separated polymer film 50/web 54/polymeric material may be burned as fuel, such as in the paper recycling plant, or otherwise be recycled.

Whereas a few specific examples of acceptable methods for forming the laminates 20, 20' are discussed above, those of ordinary skill will understand that there are a variety of ways in which the laminates can be constructed. That is, the layers of the laminates 20, 20' can be joined using any suitable process or technique. By way of example, and not limitation, the layers may be joined using adhesive bonding, thermal bonding, or any other chemical or mechanical means. Bonding may be achieved using any suitable process, for example, spraying, roll coating, extrusion lamination, or any other process.

As alluded to above, the blank 22 can be configured to be part of a container or other type of construct, such as the tray 70 shown in FIG. 3. In accordance with the first embodiment, the tray 70 is at least substantially leakproof/hermetically sealed. Therefore, it is typical for each of the fold lines 28, 32, 38 to be a score line that does not form a hole in the blank 22/laminate 20. In accordance with alternative embodiments of the present invention, the fold lines 28, 32, 38 can be formed in any conventional manner, and one or more of them can be omitted.

As best understood with reference to FIG. 3, the tray 70 of the first embodiment includes the blank 22 and a frame 72 that holds the blank in an erected configuration. The frame 72 is typically constructed of polymeric material; however, the frame can also be constructed of other types of materials. Referring also to FIG. 4, which schematically shows the frame 72 in isolation, the frame 72 includes strip-like corner elements 74 that extend downwardly and somewhat inwardly (obliquely, or more specifically acutely) from a substantially rigid band 76 of the frame 72. In accordance with the first embodiment, the corner elements 74 advantageously hermitically seal the corners of the tray 70, as will be discussed in greater detail below.

As best understood with reference to FIG. 3, the panels 24, 30, 26 (FIG. 1A) of the blank 22 (FIG. 1A) and the strip-like corner elements 74 of the frame 72 together extend around and define a substantially leakproof cavity 78 of the tray 70. Typically the polymer film 50 (FIGS. 2A and 2B) of the blank is fluid impervious and in opposing face-to-face relation with the cavity 78. The base panel 24 of the tray 70 optionally includes an embossed area 80 that is partially defined by a score-like line 82 in the base panel 24. The embossed area 80 of the base panel 24 protrudes slightly into the cavity 78 of the tray 70, and it can help to rigidify the tray.

Figure 5:
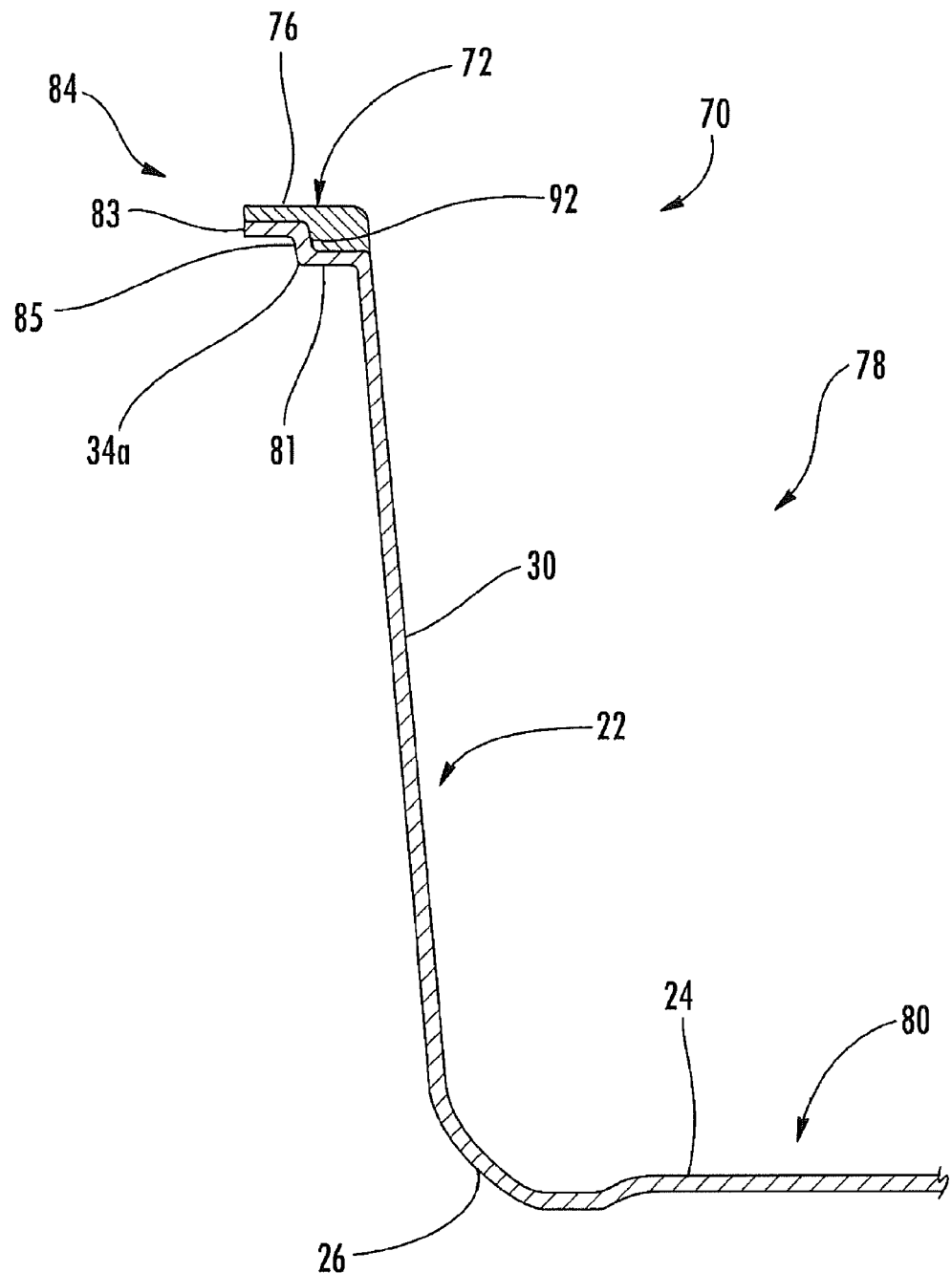
FIG. 5 is a schematic cross-sectional view of the tray of FIG. 3 taken along line 5-5 of FIG. 3, with only the cross-section being shown, in accordance with the first embodiment.

FIG. 5 is a schematic cross-sectional view of the tray 70 taken along line 5-5 of FIG. 3, with only the cross-section being shown. As best understood by referring also to FIG. 3, the tray 70 typically includes a multi-tiered rim 84. The rim 84 extends around and defines an opening to the cavity 78 of the tray 70. In accordance with the first embodiment, the upper portion of the rim 84 is defined by the band 76 of the frame 72, and the lower portion of the rim 84 is defined by the flange portions 34a-34d of the blank 22. As best understood with referenced to FIG. 5, the two tiers of the rim 84 are partially defined by an upright panel or section 85 of each of the flange portions 34a-34d of the blank. A lower flange 81 extends outwardly from the upper edge of the respective side panel 30 to the lower edge of the upright section 85. An upper flange 83 extends outwardly from an upper edge of the upright panel or section 85. All or some of the upper flange 83 can be omitted. Each upright section 85 includes an upright inner shoulder 92. As will be discussed in greater detail below, the band 76 is typically adhered to the upper surfaces of the flanges 81, 83 and the inner shoulder 92, so that the band includes a flat upper surface positioned above the upper surfaces of the flanges 81, 83, and a cover, lid or the like can be sealed to the upper surface of the band. As will also be discussed in greater detail below, typically the band 76 is thicker above the lower flange 81 than it is above the upper flange 83, such that the lower flange advantageously partially defines a relatively large channel for having molding material (e.g., fluid polymeric material) flow therein during the injection molding.

FIG. 5 is illustrative of numerous vertical cross sections of the tray 70. More specifically, FIG. 5 is illustrative of/representative of, vertical cross-sections taken through each of the side panels 30 and associated portion of the multi-tiered rim 84. On the other hand, other cross-sectional profiles are also within the scope of the present invention. For example, the flange portions 34a-34d of the blank can be shaped and/or sized differently, so that the flange portions 34a-34d do not extend all the way to the outer edge of the rim 84 of the tray 70, or so that the flange portions 34a-34d are embedded in the band 76 of the frame 72. As another example, the flange portions 34a-34d of the blank 22, or the like, can extend farther outwardly than the band 76 of the frame 72, and the rim 84 can consist substantially solely of the flange portions 34a-34d.

As best understood with reference to FIG. 3, the band 76 of the frame 72 can optionally include a minor imperfection 86 and pin holes 88. The minor imperfection 86 and the pin holes 88 result from an exemplary process by which the tray 70 is manufactured. However, the minor imperfection 86 and the pin holes 88 are optional features because it may be possible to manufacture the tray 70 without forming the minor imperfection 86 and the pin holes 88. Indeed, in one example of the present invention, the pins that form the pin holes 88 are omitted, as will be discussed in greater detail below. Also and as will be discussed in greater detail below, the frame 72 can be injection molded using a valve gate so that any imperfection 86 is minimized. Alternatively, even if the minor imperfection 86 and the pin holes 88 are formed, steps may be taken so that the they are removed or otherwise not readily visible.

An acceptable method for manufacturing the tray 70 will be discussed in greater detail below (e.g., with reference to the mold assembly 130 shown in FIG. 8A). Nonetheless, some aspects associated with an exemplary method of manufacturing the tray 70 are illustrated in FIG. 3 and will, therefore, now be briefly discussed with reference to FIG. 3. The minor imperfection 86 results from the frame 72 being manufactured from molding material, namely polymeric material, that is injected into a mold. That is, the imperfection 86 is located at the sole location where the liquid molding material is injected (e.g., via a valve gate). The arrows drawn onto the frame 72 in FIG. 3 schematically illustrate the directions in which some of the fluid molding material flows to form the frame 72. The arrows drawn onto the frame 72 in FIG. 3 are schematic because they would not be seen on a formed tray 70.

In accordance with the first embodiment and referring to FIG. 5, flow of the fluid molding material is controlled in a manner that seeks to keep the band 76 of the frame 72 on top of the flange portions 34 of the blank 22. More specifically, end edges of the flange portions 34a-34d (FIG. 1A), namely the protruding features 44a-44h (e.g., see the protruding features 44a, 44b identified in FIG. 1B), are respectively overlapped and at least some of the flange portions are optionally held in a predetermined manner by pins (e.g., see pins 144 shown in FIGS. 8A and 11B) that respectively cause the pin holes 88 to be formed, so that the fluid molding material flows over the flange portions 34a-34d during injection molding, as will be discussed in greater detail below. Even more specifically and as best understood by referring to FIGS. 1A and 3, the flange portions 34a-34d respectively include overlapping end edges 90a, 90b, 90c, 90d (which are hidden from view by the band 76 in FIG. 3 and, therefore, illustrated by dashed lines in FIG. 3). In the tray 70 shown in FIG. 3, the end edge 90a of the flange portion 34a overlaps the adjacent end of the flange portion 34b, so that the end edge 90e of the flange portion 34b is below the flange portion 34a. Similarly, the end edge 90b of the flange portion 34a overlaps the adjacent end of the flange portion 34c. Likewise, the end edge 90c of the flange portion 34b overlaps the adjacent end of the flange portion 34d. Lastly, the end edge 90d of the flange portion 34c overlaps the adjacent end of the flange portion 34d.

In accordance with other embodiments of the present invention, different techniques can be used to form the band 76 of the frame 72 on top of the flange portions 34 of the blank 22. As one example, the above and below discussed pinning of the overlapping end edges 90a-90d can be omitted, and the frame 72 can be formed by injecting the fluid molding material into the main cavity of the mold assembly (e.g., mold assembly 130 of FIG. 8A) at multiple locations. In contrast and in accordance with other alternative embodiments of the present invention, the band 76 of the frame is not formed on top of the flange portions 34a-34d of the blank 22. For example, the flange portions 34a-34d can be embedded within the band 76 or be positioned above the band.

Figure 6:
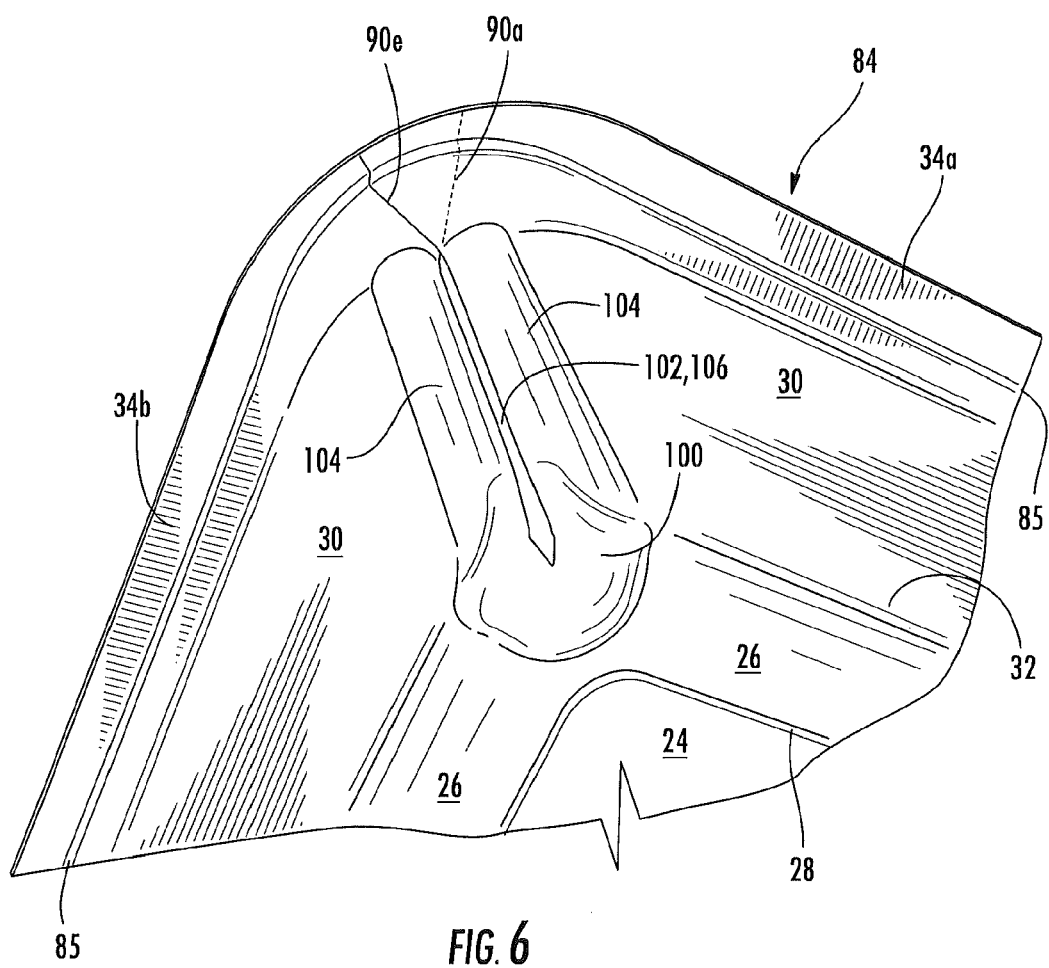
FIG. 6 is a schematic partial view that illustrates the exterior of a representative corner portion of the tray of FIG. 3, with the corner portion being viewed generally from below.

FIG. 6 schematically shows the outer side of a representative corner of the tray 70, as viewed generally from below. In accordance with the first embodiment, the corner includes an outwardly protruding bulbous portion 100 that is located at the lower end of the corner. Also, a relatively small gap 102, which is defined between the edges of the side panels 30 that partially define the corner, extends upwardly from the bulbous portion 100. At the lower end of each corner of the tray 70, outer surfaces of the side panels 30 and intermediate panels 26 define an outwardly curved surface of the bulbous portion 100, and the corresponding inner surfaces of the side panels 30 and intermediate panels 26 define a substantially bowl-shaped recess 101 shown in FIG. 7B.

Figure 7A:
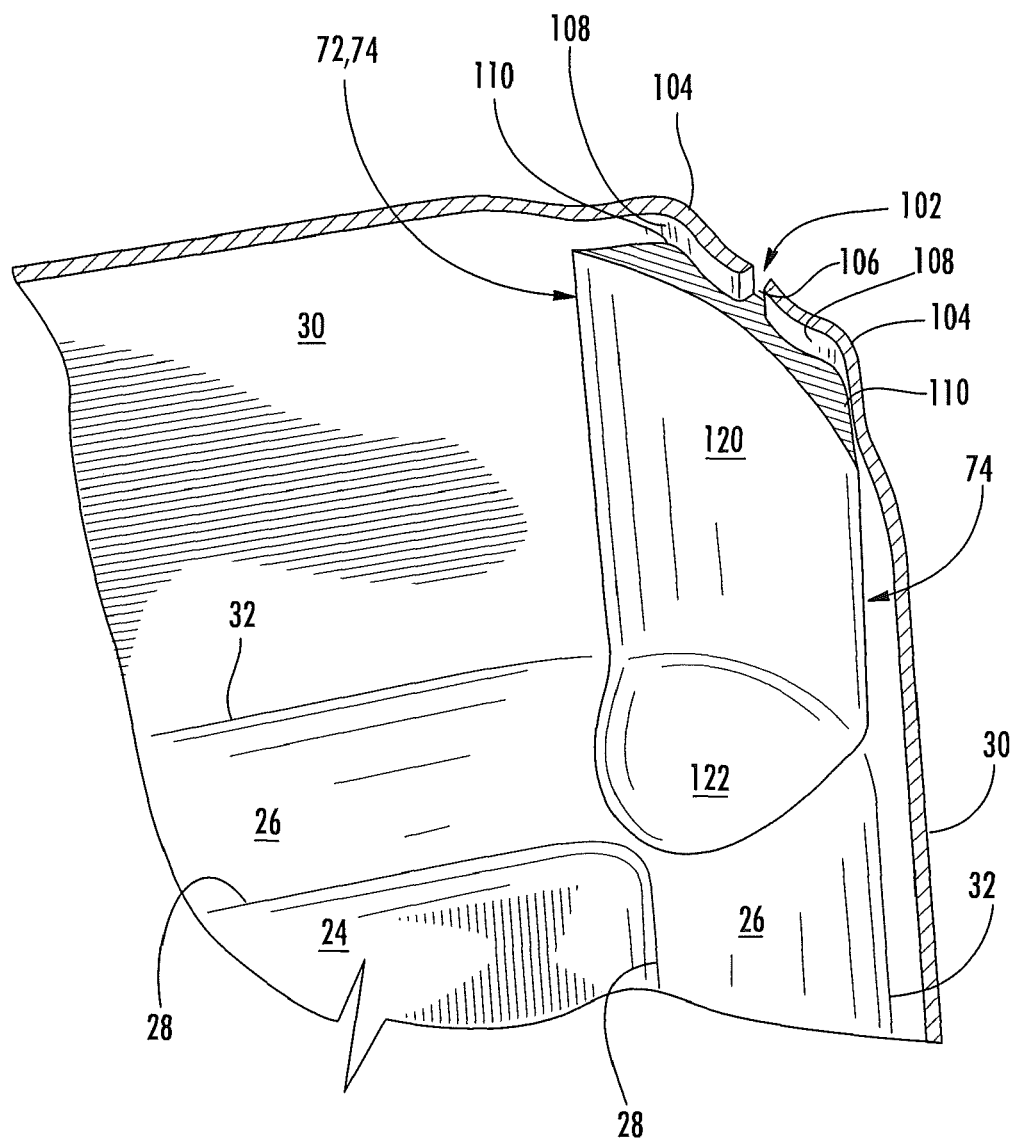
FIG. 7A is a schematic view of the interior of a portion of the corner of FIG. 6, with the upper portion of the tray having been cut away.
Figure 7B:
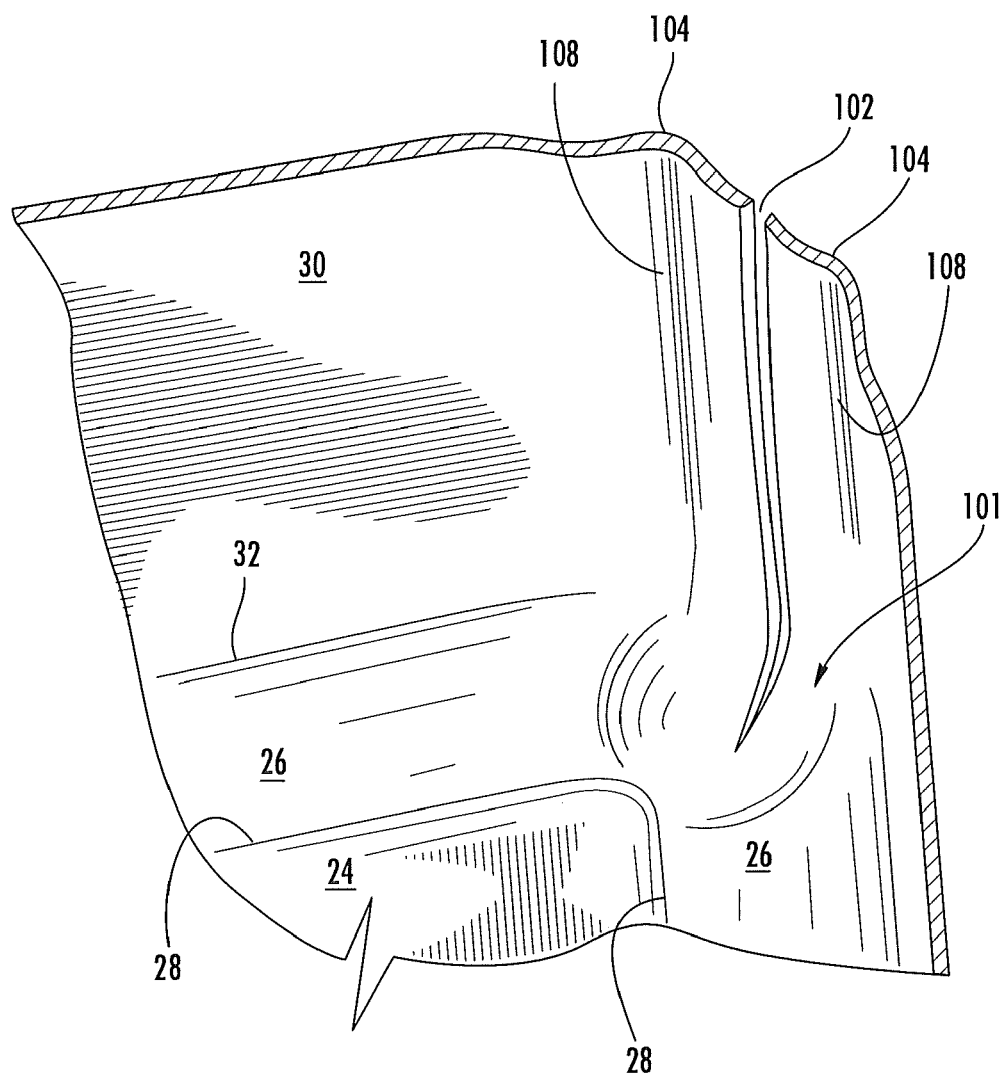
FIG. 7B is like FIG. 7A, except that the corner element of the frame that is shown in FIG. 7A has been removed.

FIG. 7A illustrates the inner side of the representative corner illustrated in FIG. 6, with an upper part of the tray 70 cut away and an additional upper portion of the strip-like corner element 74 of the frame 72 cut away. FIG. 7B is like FIG. 7A, except that the corner element 74 of the frame 72 has been removed. As best understood with reference to FIG. 7A, the strip-like corner element 74 of the frame 72 can be characterized as being, or including, a strip that extends along and at least partially defines the corner of the tray 70, with this strip obstructing the gap 102. Referring to FIG. 6 and in accordance with the first embodiment, a majority of the outer side of the corner is defined by the paperboard 52 of the blank 22, except that a bead 106 (e.g., an elongate, outwardly projecting protrusion) of the associated strip-like corner element 74 of the frame 72 protrudes into and fills (e.g., hermetically seals) the gap 102. Similarly and as shown in FIG. 6, all of the lower surface of the rim 84 is defined by paperboard 52 of the blank 22. Nonetheless, differently configured corners and rims are within the scope of the present invention. For example, the lower surface of the rim 84 can be partially in the form of the band 76 (FIG. 3), as will be discussed in greater detail below.

As best understood with reference to FIG. 6, outwardly projecting ribs 104 extend upwardly form the bulbous portion 100 and are positioned on opposite sides of the gap 102. For each corner of the tray 70, its bead 106 is collinear with the corner's elongate centerline that extends along the corners' length, and the bead is spaced apart from (e.g., centered between) the corner's ribs 104. As shown in FIG. 6, the ribs 104 comprise curved portions of the panels 30. The outward surface of each rib 104 is an outwardly projecting, convex protrusion of the respective panel 30, with the outwardly projecting protrusion of the panel being elongate and extending along the respective corner of the tray 70. In accordance with the first embodiment, these outwardly projecting protrusions of the panels 30/ribs 104 are not pleats.

As best understood with reference to FIG. 7B, for each rib 104, the inward surface of the associated curved portion of the panel 30 defines a recess 108 that is elongate and extends along the corner of the tray 70. In addition and as best understood with reference to FIG. 7A, each rib 104 further includes a portion of the respective strip-like corner element 74 of the frame 72, namely an outwardly projecting, convex protrusion 110 that is elongate, extends along the corner, and extends into the respective recess 108 of the curved portion of the respective panel 30.

As best understood with reference to FIG. 3 and primarily with reference to FIG. 7A, for each interior corner of the tray 70, from top to bottom, the inner side of the corner is smoothly rounded from side to side. The strip-like corner element 74 of the frame 72 that extends into the corner includes an inwardly facing, smooth surface that can be characterized as having an upper portion 120 and a lower portion 122. The corner element 74 is shaped to contribute to the smooth side-to-side curvature of the inner side of the corner of the tray 70. More specifically, the upper portion 120 (of the inwardly facing surface of the strip-like corner element 74) extends concavely and smoothly between the adjacent side panels 30, and all the way up to the rim 84. The lower portion 122 (of the inwardly facing surface of the corner element 74) extends smoothly and in somewhat of a concave/bowl-like fashion between the adjacent intermediate panels 26.

The exemplary manner in which the corners of the tray 70 are constructed is advantageous because it avoids pleating, or the like, of the blank 22. The avoidance of the pleating, or the like, and the sealing of the relatively small gap 102 (FIGS. 6, 7A and 7B) can play an advantageous role with respect to the tray 70 being hermetically sealed and, therefore, leakproof. More specifically, the outwardly bulbous portion 100 (FIG. 6) in combination of the outwardly projection ribs 104 (FIG. 6) helps to provide a pleat-free corner with a smoothly-radiused interior surface, without there being an undercut. This lack of an undercut allows the tray 70 to be easily removed from the mold (e.g., mold assembly 130 of FIG. 8A) in which it is formed, as will be discussed in greater detail below. As an example of an additional advantage that is discussed in greater detail below, the outwardly bulbous portion 100 and the outwardly projection ribs 104 help to define relatively large channels for accommodating flowing molding material during the injection molding. Notwithstanding the foregoing, other configurations of the corners and other features are also within the scope of the present invention, and in some applications the tray 70 may not need to be, and therefore may not be, constructed to be leakproof.

Figure 8A:
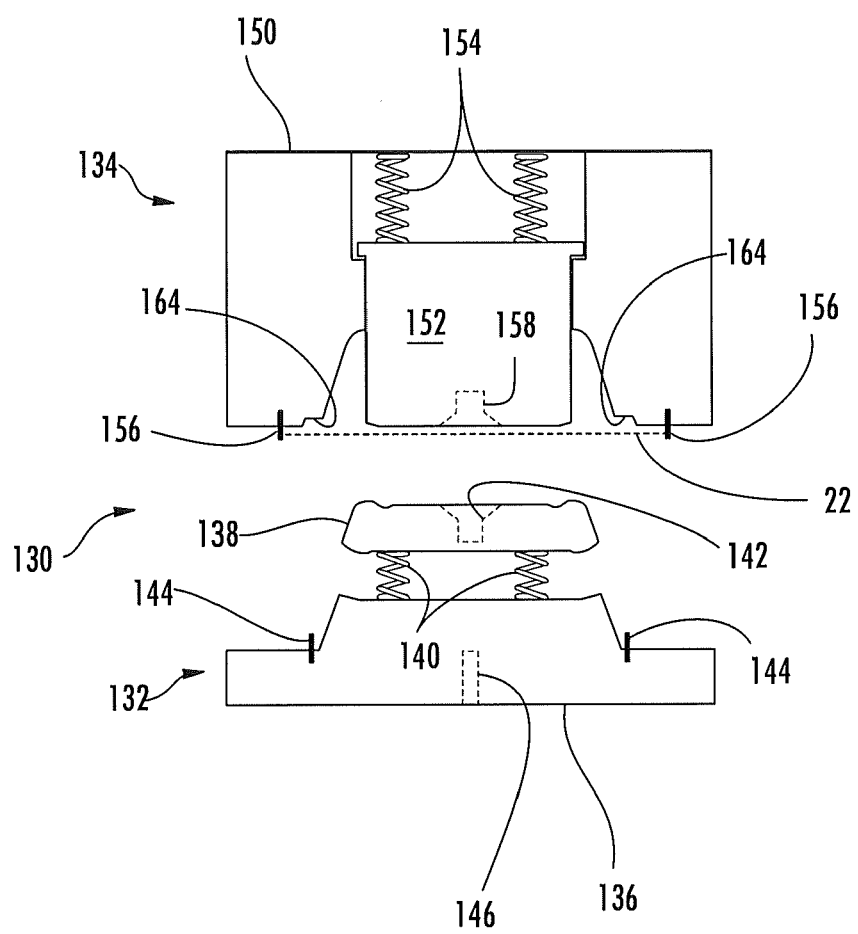
FIG. 8A schematically illustrates a mold assembly in an open configuration, with the blank of FIG. 1 shown in dashed lines as being associated with the mold assembly, in accordance with the first embodiment.

FIG. 8A schematically illustrates a forming tool (e.g., mold assembly 130) that can be used in the manufacture of the tray 70, in accordance with the first embodiment. The mold assembly 130 is in an open configuration in FIG. 8A, and it includes a male mold 132 and a female mold 134. The male mold 132 includes an outer mold 136 to which a nose unit 138 is movably mounted. A group of springs 140, only two of which are schematically shown in FIG. 8A, urge the nose unit 130 toward the female mold 134. The nose unit 138 typically includes one or more flushly mounted vacuum cups 142 that are open at the face of the nose unit 138. The one or more vacuum cups 142 are connected to a suction source (not shown) so that a suction can be supplied to the vacuum cups 142 in a controlled manner, as will be discussed in greater detail below. Optionally, four securing elements, such as securing pins 144, protrude from the male outer mold 136 for aiding in the forming of the tray 70, as mentioned above and as will also be discussed below. There can be a greater or lesser number of securing elements (e.g., securing pins 144), and in some situations they can be completely omitted.

A port 146 (e.g., with a valve gate) is defined in the male outer mold 136, or otherwise provided, for injecting fluid molding material, or the like, into the mold assembly 130 to form the frame 72. In one example, the port 146 is in the form of, or includes, a valve gate. More specifically, a valve stem is moved to open and close the port 146 in a manner that seeks to minimize shearing of solidified molding material at the imperfection 86 (FIG. 3) caused by the port 146. This can advantageously aid in the formation of a smooth surface on the band 76 of the frame 72.

The female mold 134 includes an outer mold 150 to which an embossing unit 152 is movably mounted. A group of springs 154, only two of which are schematically shown in FIG. 8A, urge the embossing unit 152 toward the male mold 132. A group of locating pins 156 are typically mounted to the female outer mold 150 in an arrangement that is for helping to position the blank 22 in a predetermined location, as will be discussed in greater detail below. The flat blank 22 is schematically illustrated by dashed lines in FIG. 8A. The embossing unit 152 typically includes one or more flushly mounted vacuum cups 158 that are open at the face of the embossing unit 152. The one or more vacuum cups 158 are connected to a suction source (not shown) so that a suction can be supplied to the vacuum cups 158 in a controlled manner, as will be discussed in greater detail below.

Figure 9:
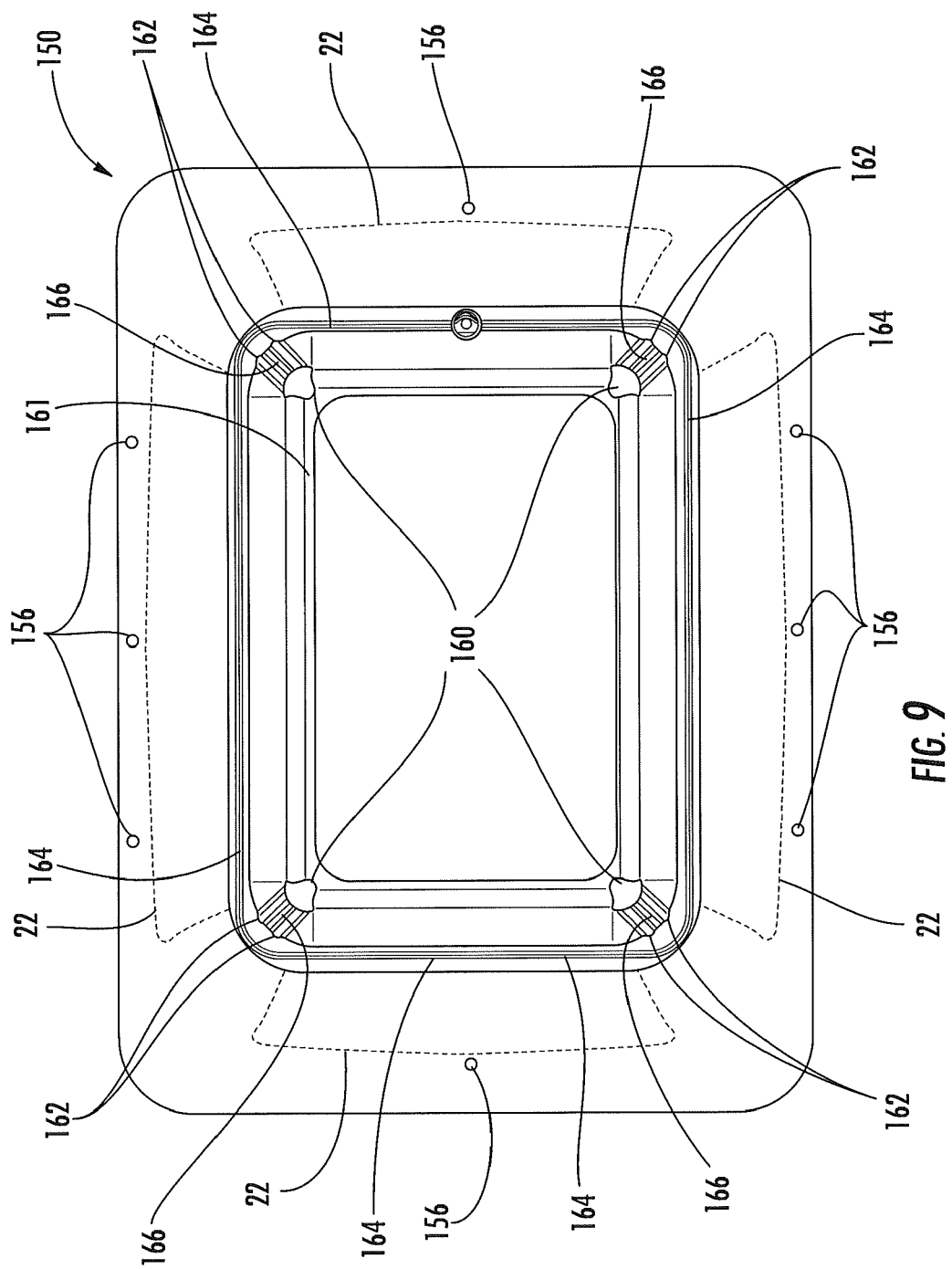
FIG. 9 is a schematic view looking into the cavity of the outer mold of the female mold of the mold assembly of FIGS. 8A and 8B, with a portion of the blank of FIG. 1 schematically shown in dashed lines as being associated with the outer mold of the female mold, in accordance with the first embodiment.

The shapes of the surfaces of the female outer mold 150 that define the main cavity of the female outer mold 150 and the face of the embossing unit 152 respectively correspond to the shapes of the exterior surfaces of the tray 70. As shown in FIG. 9, the female outer mold 150 includes interior corners that are positioned in the main cavity of the female outer mold 150. Each of these interior corners includes a subcavity 160 that is at least partially in the form of a concavity. The subcavities 160 are respectively proximate the corners of the centrally open base 161 of the female outer mold 150. The central opening of the base 161 is for being in receipt of the embossing unit 152 (e.g., see FIG. 8A). The subcavities 160 are bowl-shaped recesses that partially define the main cavity of the female outer mold 150 and the interior corners of the female outer mold 150. The subcavities 160 are for at least partially forming the outwardly bulbous portions 100 (FIG. 6) of the corners of the tray 70.

Each of the interior corners in the main cavity of the female outer mold 150 also includes a pair of spaced apart, elongate indentions 162 that respectively extend from the subcavities 160 all the way to the tiered shoulder 164 of the female outer mold 150. The shoulder 164 extends all the way around the main cavity of the female outer mold 150, and can be characterized as defining the opening to the main cavity of the female outer mold 150. The shoulder 164 is tiered/has a series of step-like surfaces for at least partially forming the lower surface of the rim 84 (e.g., see FIG. 5) of the tray 70; more specifically for at least partially forming (e.g., at least partially controlling folding of) the lower flange 81, upper flange 83 and upright section 85 of the rim 84. The elongate indentions 162 are for at least partially forming the outwardly projecting ribs 104 (FIG. 6) of the corners of the tray 70. Between each pair of elongate indentions 162 is an elongate central region 166 that projects into the main cavity of the female outer mold 150. The elongate central regions 166 respectively extend from the subcavities 160 all the way to the shoulder 164 of the female outer mold 150. The central regions 166 are respectively for at least partially forming the centerlines of the corners of the tray 70. Differently shaped corners within the main cavity of the female outer mold 150 are also within the scope of the present invention.

An exemplary method of forming the tray 70 using the mold assembly 130 and the blank 22 is described in the following. As best understood with reference to FIGS. 8A and 9, in an initial step, the flat blank 22 (shown by dashed lines in FIGS. 8A and 9) is placed against the female mold 134 so that the locating pins 156 are arranged around, and engage, the periphery of the blank 22. That is, the locating pins 156 help to facilitate proper placement of the blank 22. The blank 22 is held in this proper placement by virtue of the embossing unit 152 being in its outward configuration, and suction being supplied to the vacuum cups 158, so that the vacuum cups hold the blank. As a result, the blank 22 is securely held against the face of the embossing unit 152, as is partially schematically illustrated by the dashed-line showing of the flat blank 22 in FIG. 8A.

While the blank 22 is being held in place against the face of the embossing unit 152 as a result of suction being supplied to the vacuum cups 158, the entire female mold 134 is advanced toward the stationary outer mold 136 of the male mold 132 under the action of a hydraulic press (not shown), or the like. Alternatively, the male mold 132 could be moved toward the female mold 134. As the flat blank 22 comes into contact with the nose 138, the base panel 24 of the blank 22 is sandwiched between the face of the nose 138 and the face of the embossing unit 152, and the springs 140, 154 compress. The face of the nose 138 and the face of the embossing unit 152 are typically cooperatively shaped so that sandwiching of the blank 22 between the nose 138 and the embossing unit 152 causes the embossed area 80 (FIGS. 3 and 5) to at least eventually be formed in the base panel 24 of the blank 22. As the mold assembly 130 further closes, the base panel 24 is securely held between the nose 138 and the embossing unit 152, and interaction between the blank 22 and the mold assembly 130 causes folding to occur along the fold lines 28, 32, 38 of the blank so that the blank becomes erected. As a result, the blank 22 is in an erected state within the main cavity of the mold assembly 130 when the mold assembly achieves the fully closed configuration schematically illustrated in FIG. 10A.

Figure 10A:
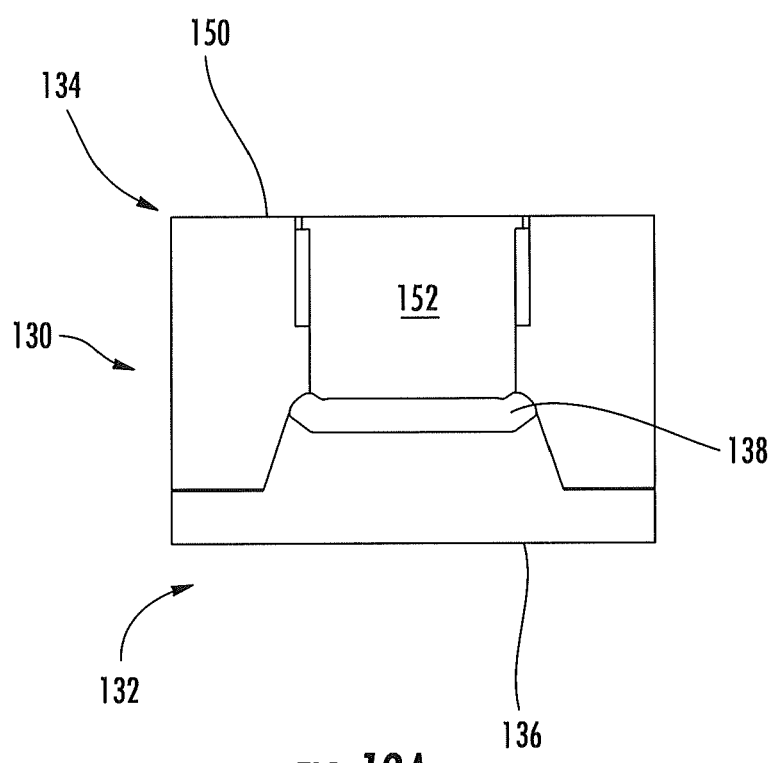
FIG. 10A schematically illustrates the mold assembly of FIG. 8A in its closed configuration, in accordance with the first embodiment.

Prior to the mold assembly reaching the closed configuration shown in FIG. 10A, while the mold assembly 130 is still closing, the differences between the lengths of the protruding features 44a-44h (FIGS. 1A and 1B) can be utilized to facilitate the desired overlapping of the end edges of the flange portions 34a-34d, which was discussed above with reference to FIG. 3.

Figure 10B:
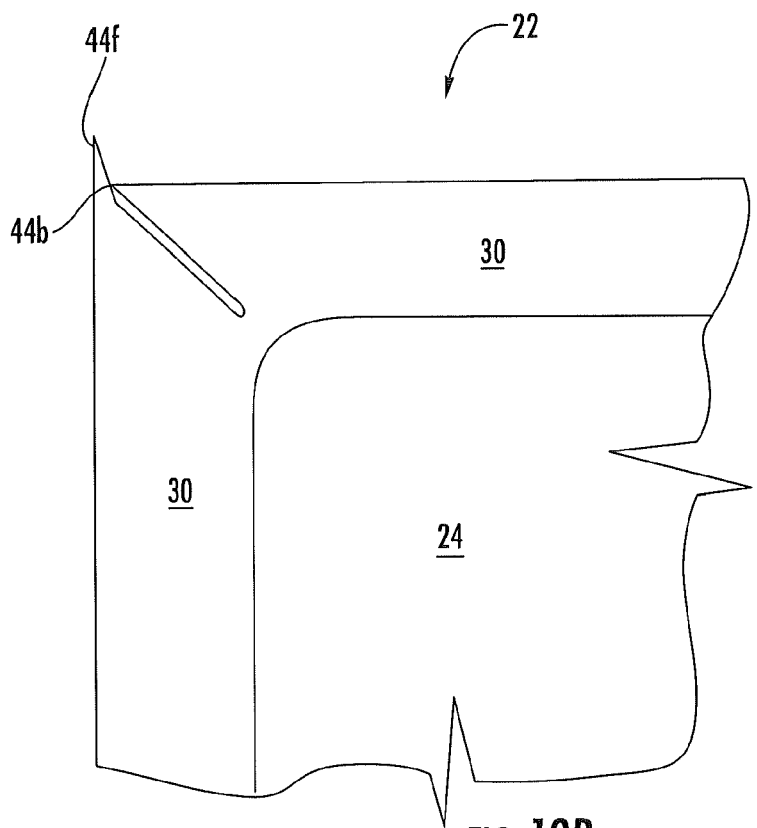
FIG. 10B is a schematic, isolated top plan view of a portion of a representative corner of the blank of FIG. 1 with side panels folded upwardly as though the blank has been partially forced into the cavity of the female mold, in accordance with the first embodiment.

FIG. 10B is a schematic, isolated top plan view of a portion of a representative corner of the blank 22 with side panels 30 folded upwardly. FIG. 10B illustrates an intermediate step of the blank 22 being erected by closing the blank in the mold assembly 130. FIG. 10B is representative of the blank 22 having been partially forced into the cavity of the female outer mold 150. As shown in FIG. 10B, since the protruding feature 44f is longer than the protruding feature 44b, the protruding feature 44f extends farther outwardly than the protruding feature 44b. That is, when the blank 22 has been partially forced into the cavity of the female outer mold 150 to the degree schematically shown in FIG. 10B, the longer protruding features 44e, 44f, 44g, 44h protrude farther outwardly than the shorter protruding features 44a, 44b, 44c, 44d.

Figure 8B:
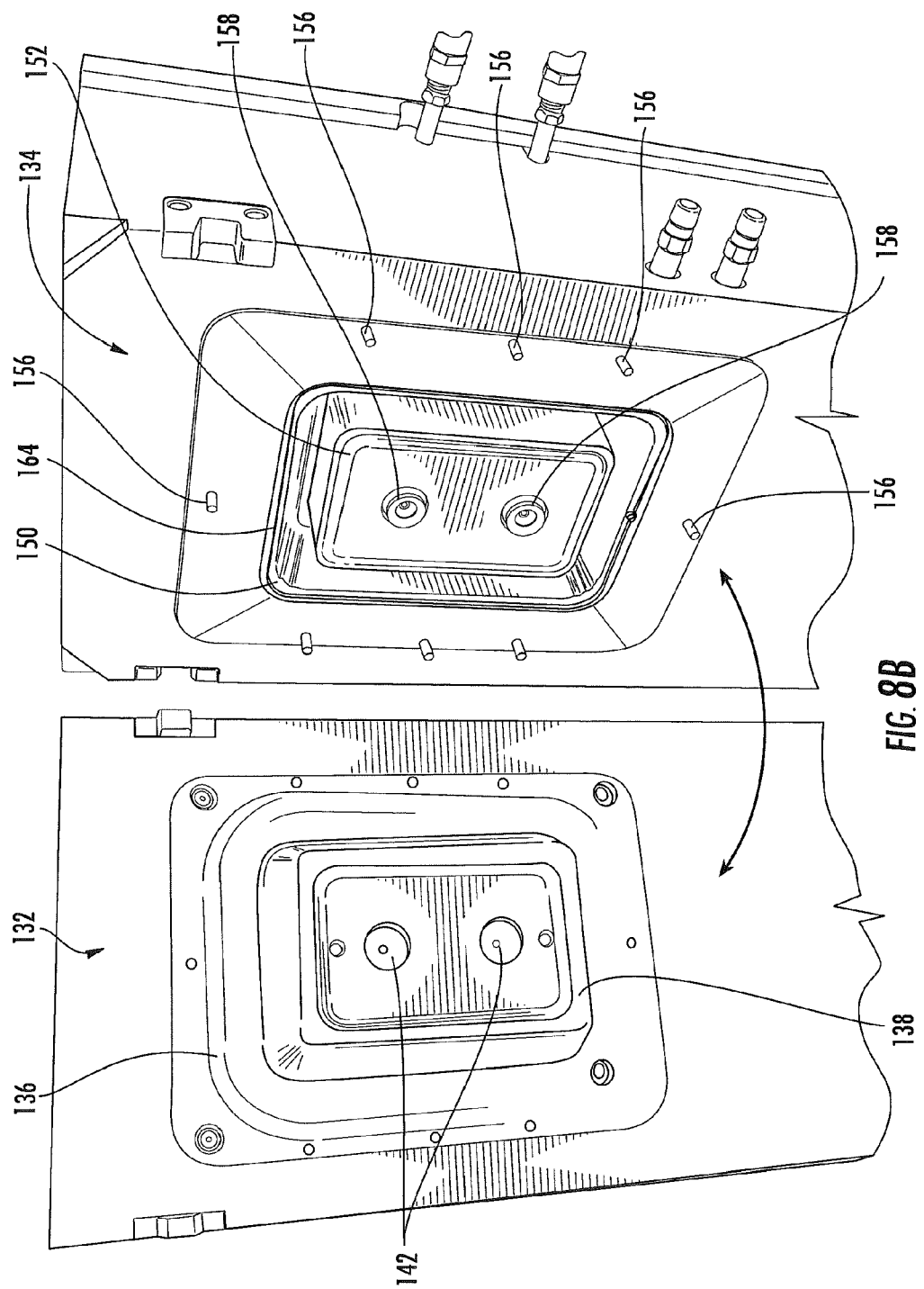
FIG. 8B is a schematic pictorial view of the mold assembly of FIG. 8A in an open configuration.
Figure 10C:
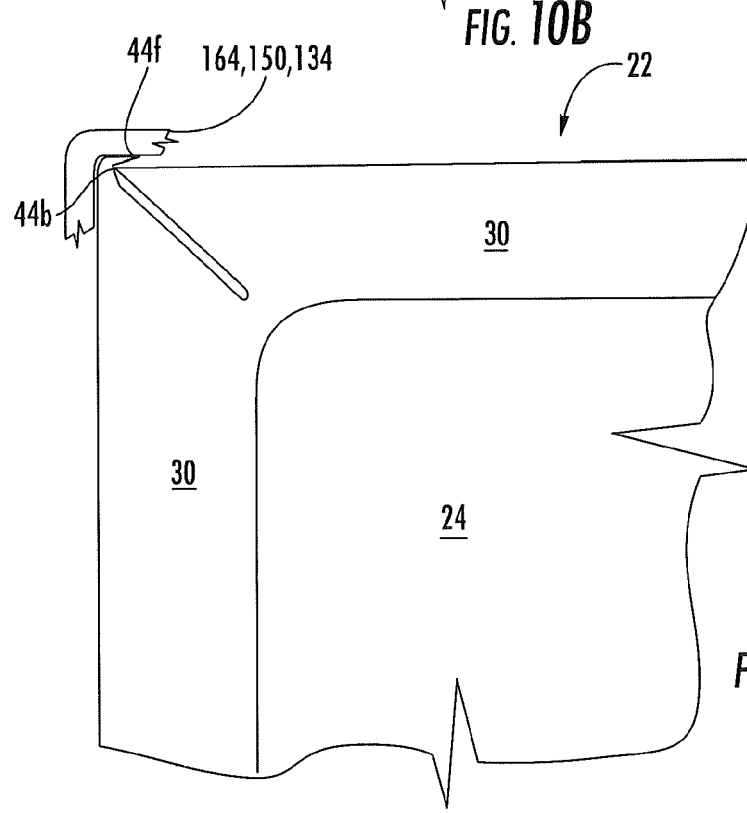
FIG. 10C is like FIG. 10B, except that the blank has been farther forced into the cavity of the female mold, and a longer protruding feature of the blank is engaged to, and therefore being folded by, the shoulder of the outer mold of the female mold, in accordance with the first embodiment.

FIG. 10C is like FIG. 10B, except that the blank 22 is schematically shown as having been farther forced into the cavity of the female outer mold 150, so that the longer protruding feature 44f is being abutted by the shoulder 164 of the female outer mold 150 (the shoulder 164 is shown in greater detail in FIGS. 8A, 8B and 9). The shoulder causes the longer protruding feature 44f to move (e.g., fold) into superposed relationship with the shorter protruding feature 44b. That is, while the mold assembly 130 is closing, because of their greater length, the longer protruding features 44e, 44f, 44g, 44h engage the shoulder 164 of the female outer mold 150 before the shorter protruding features 44a, 44b, 44c, 44d can engage the shoulder 164. As a result, the longer protruding features 44e, 44f, 44g, 44h respectively move (e.g., fold) into superposed relationships with the shorter protruding features 44a, 44b, 44c, 44d, so that the shorter protruding features 44a, 44b, 44c, 44d are respectively positioned between the longer protruding features 44e, 44f, 44g, 44h and the female outer mold 150. As a result, when the resulting tray 70 is viewed from above, the shorter protruding features 44a, 44b, 44c, 44d respectively overlap the longer protruding features 44e, 44f, 44g, 44h, as schematically illustrated in FIG. 3 by the broken-line showing of the overlapping end edges 90a, 90b, 90c, 90d of the shorter protruding features 44a, 44b, 44c, 44d of the flange portions 34a-34d.

As best understood with reference also to FIG. 8A, in the configuration illustrated by FIG. 10C, the female mold 134 has been advanced so that the mold assembly 130 is in the fully closed configuration shown in FIG. 10A, except that the male outer mold 136 is still extended from the nose unit 138 so that male outer mold 136 does not interfere with the above-discussed folding of the longer protruding features 44e, 44f, 44g, 44h. That is and in accordance with the first embodiment, the embossing unit 152 achieves its retracted configuration (shown in FIG. 10A) with respect to the female outer mold 150 before the nose unit 138 achieves its retracted configuration (shown in FIG. 10A) with respect to the male outer mold 136. This difference can be achieved by having the group of springs 140 of the male mold 132 being stronger than the group of springs 154 of the female mold 134.

After the configuration schematically illustrated by FIG. 10C, the mold assembly 134 is fully closed so that the flange portions 34a-34e (FIG. 1) are partially folded, such as by at least partially being bent/folded along the outer fold lines 36 (FIG. 1). In the fully closed configuration of the mold assembly 130 shown in FIG. 10A, channels (e.g., see FIGS. 11A, 11B and 13), which are for having a molding material (e.g., fluid polymeric material) flow therein, are defined within the mold assembly. The channels, which are for having the molding material flow therein are discussed in the following, in accordance with the first embodiment. These channels are at least primarily defined between the partially erected blank 22 and the male mold 132. These channels at least generally correspond to the shape of the frame 72, although at least some of the channels expand during the injection molding due to movement of respective portions of the blank 22 while the molding material flows within the channels. More specifically and for example, as fluid molding material (e.g., fluid polymeric material) is forced under pressure into initial channels, at least some of the initial channels expand and are transformed into resultant channels due to movement of respective portions of the blank 22 while the fluid molding material flows within the channels. This includes liquid molding material flowing with sufficient force to cause portions of the blank 22 to be pressed against respective surfaces of the female mold 134 (e.g., FIG. 9), so that respective parts of the blank are forced against the shoulder 164, and into the subcavities 160 and elongate indentations 162.

In one example, the liquid molding material is a polymer that is injected into the closed mold assembly 130 via the port 146, with the injected polymer being at a temperature of about 500 degrees Fahrenheit and a pressure of approximately 2000 lb/in$^2$. The injection temperature and pressure may depend upon the polymer that is injected, and a wide variety of polymers, temperatures and pressures are within the scope of the present invention. For example and not for the purpose of limiting the scope of the present invention, suitable polymers for being injected may be polypropylene, nylon and polyethylene terephthalate (PET). In one example, the liquid molding material is polypropylene that is injected into the closed mold assembly 130 via the port 146, with the injected polypropylene being at a temperature of about 450 degrees Fahrenheit and a pressure of approximately 1750 lb/in$^2$. The polymeric liquid molding material that is injected into the closed mold assembly 130 via the port 146 may include one or more additives, such as short glass fibers. Impregnating the polymeric liquid molding material with short glass fibers can help to advantageously control/minimize shrinkage of the solidifying polymeric material. The polymeric liquid molding material may include about 30% glass fibers by weight, although other amounts and other additives are also within the scope of the present invention.

More specifically, the flange portions 34a-34c (FIG. 1A) are typically only partially folded during closing of the mold assembly 130, such that the flowing molding material in the mold assembly 130 at least completes the forming and/or bending and/or folding of the flange portions (e.g., by pressing them against the female mold's shoulder 164) that is necessary to provide the multi-tiered rim 84 (FIG. 5). Similarly, when the mold assembly 130 is closed and prior to the injecting of the molding material, the recesses 101, 108 (e.g., FIG. 7B) in the blank are not yet formed or are only partially formed, such that the flowing molding material in the mold assembly 130 at least completes the forming and/or bending and/or folding that creates the recesses 101, 108, by pressing the respective portions of the blank into the female mold's subcavities 160 (FIG. 9) and elongate indentations 162 (FIG. 9).

Stated different and in accordance with one example of the first embodiment, in each interior corner of the female outer mold 150, the elongate indentations 162 advantageously receive respective portions of the blank 22 and thereby help to define relatively large channels for accommodating the flow of molding material. These relatively large channels seek to help keep the fluid molding material in predetermined areas, namely it causes the strip-like corner elements 74 of the frame 72 to be formed, for the most part, within the cavity 78 of the tray 70. As best understood with reference to FIGS. 6 and 7A, these relatively large channels respectively correspond to the elongate, relatively thick portions of the frame's corner elements 74 that are respectively part of the outwardly projecting ribs 104.

Stated different and in accordance with another example of the first embodiment, the forceful flowing of the molding material can also force at least portions of the flange potions 34a-34d of the blank 22 against respective portions of the shoulder 164 of the female mold 134. That is, as the polymeric fluid flows in the channels, it pushes respective portions of the paperboard 52, or the like, of the blank 22 into intimate contact with respective portions of the female mold 134.

Figure 11A:
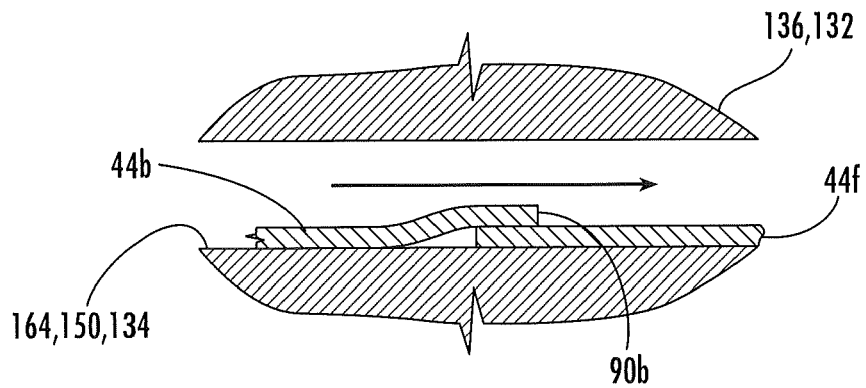
FIG. 11A schematically illustrates, by way of an arrow, molding material flowing in a downstream direction through a representative channel in the closed mold assembly, with the flowing material interacting with a portion of the blank of FIG. 1, in accordance with the first embodiment.

For example, and as can be best understood also with reference to FIGS. 1B and 10C, FIG. 11A schematically illustrates, by way of an arrow, the injected molding material flowing in a downstream direction through a representative channel at an upper interior corner of the mold assembly 130. As shown in FIG. 11A, the channel is defined between the shoulder 164 (which is part of the female outer mold 150) and the male outer mold 136. The protruding features 44f, 44b can be characterized as being within the channel, or the channel can alternatively be characterized as being defined between the protruding features 44f, 44b and the male outer mold 136. The protruding features 44f, 44b are overlapped, and the edge 90b of the shorter protruding feature 44b is positioned between the longer protruding feature 44f and the channel. With respect to the portion of the channel shown in FIG. 11A, as the injected molding material flows through the upstream portion of the channel it forces the shorter protruding feature 44b against the shoulder 164. The flow of the molding material through the intermediate portion of the channel forces the end section of the shorter protruding feature 44b against the end section of the longer protruding feature 44f, which advantageously seeks to keep the flowing molding material from lifting the edge 90b in a manner that might allow the molding material to flow on the wrong side of the flange portions 34a-34d of the blank 22. A securing pin 144 (FIGS. 8A and 11B) is not shown in the channel of FIG. 11A because, for example, the securing pins 144 can be omitted.

Figure 11B:
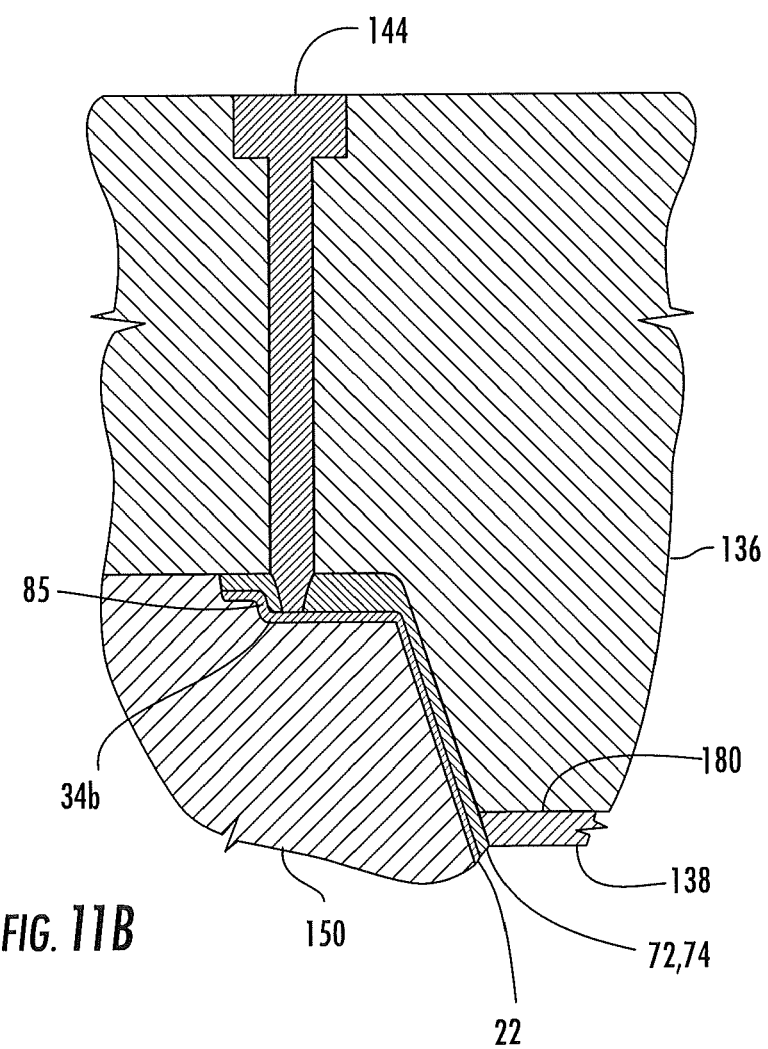
FIG. 11B is a cross-sectional view that schematically illustrates portions of the mold assembly interacting with a portion of the blank of FIG. 1 and a portion of the frame of FIG. 4, in accordance with the first embodiment.

As best understood with reference to FIGS. 1 and 3 and the portion of the representative corner schematically shown in FIG. 11B, the securing pins 144 (which are optional and may be omitted) are respectively proximate, yet distant from the end edges 90a-90d. The securing pins 144 may respectively engage and hold the flange portions 34b-34d of the blank 22 against the shoulder 164 of the female outer mold 150 to help define the channels in which the fluid molding material flows, and to maintain the proper positioning of the molding material (i.e., frame 72) with respect to the blank 22. From the perspective of the flowing molding material, for each pair of closely adjacent end edges of the flange portions 34a-34d, typically only the downstream flange portion is pinned down by a securing pin 144. That is, typically the securing pins 144 engage only the flange portions 34b-34d at positions adjacent to the longer protruding features 44e, 44f, 44g, 44h. Depending, for example, upon the pressure at which the fluid molding material is injected and/or the number of, or location of, the injection ports (e.g., see the port 146 in FIG. 8A) at which the fluid molding material is injected and/or the overlapping between the protruding features 44a-44h, the securing pins 144 can be omitted. Typically the securing pins 144 will be omitted, since they can cause imperfections and/or cause the tray 70 to stick to the male mold 132. That is, variously configured mold assemblies 130, trays 70 and other features are within the scope of the present invention.

More specifically regarding the channels in which the frame's band 76 of the first embodiment is formed, there is a relatively large inner channel and a relatively small outer channel. As can be best understood with reference to FIG. 5, the portion of the band 76 that is to the right of an imaginary vertical line that extends along the shoulder 92 and to the top of the band 76 corresponds to the relatively large inner channel, and the remainder of the band 76 corresponds to the relatively small outer channel. During the injection molding, the fluid molding material primarily flows along the relatively large inner channel, and flows from the relatively large inner channel outwardly to the relatively small outer channel. This outwardly flowing seeks to help keep the molding material in predetermined areas, namely it helps to force the flange portions 34a-34d against the shoulder 164 of the female outer mold 150 in a manner that seeks to prevent the flange portions 34a-34d from folding in the wrong direction (not shown).

As best understood with reference to FIG. 11B, the tips of the securing pins 144 extend into the relatively large outer channel. As can be best understood with reference to FIG. 6, the upright section 85 of the flange portions 34a-34d is closer to the outer edge of the rim 84 in the corners of the tray 70, so that the width of the relatively large inner channel is larger in the corners of the tray 70 than elsewhere. This allows for the tips of any securing pins 144 to extend into the relatively large inner channel at the corners of the tray 70 without unduly restricting the flow of the fluid molding material. Also so as not to unduly interfere with the flow, the tips of the securing pins 144 are positioned closer to the outer side of the relatively large inner channel, as shown in FIG. 11B.

After the liquid molding material solidifies so that the tray 70 is formed within the mold assembly 130, the mold assembly is opened. While the mold assembly is being opened, suction is supplied to the vacuum cups 142 of the male mold 132, and not to the vacuum cups 158 of the female mold 134, so that the formed tray 70 is held by suction to the nose 138 of the male mold 132. The tray 70 can be readily removed upon cessation of the suction. Thereafter, the mold assembly 130 can be used to manufacture another tray 70.

As mentioned above, the corners of the tray 70 are typically constructed in a manner that seeks to make the tray leakproof. In addition, the corners are typically formed so that the tray 70 does not include an undercut that inhibits the tray 70 from being removed from the mold assembly 130. Notwithstanding the foregoing, other configurations of the corners and tray 70 are also within the scope of the present invention. For example, the tray 70 could be modified so that it is not leakproof, for applications that do not require leakproofness.

In accordance with the first embodiment, the film 50 of the laminate 20/blank 22 and the molding material (e.g., polymeric material) from which the frame 72 are constructed are selected to be compatible, so that there is good adhesion between the frame 72 and the film 50 of the blank 22. In one example, both the frame 72 and the film 50 are a polyolefin, such as polypropylene. As another example, each of the frame 72 and the film 50 can be nylon or polyethylene terephthalate. A wide variety of other polymers can also be used, as discussed in greater detail below. When the film 50 is a coextrusion, it is the outer-most layer of the film 50 that is selected to be compatible with the frame 72 so that there is good adhesion therebetween. In an alternative embodiment of the present invention, such as where the materials are selected so that there is less adhesion between them (i.e., less adhesion between the flame 72 and the blank 22), the blank or portions thereof (e.g., edges of the blank) can be at least partially embedded in, or encapsulated by, the frame in a manner such that the blank and the frame are nonetheless fixedly attached to one another, if desired.

Initially forming the blank 22 with the fold lines 28, 32, 38, which can be score lines, seeks to aid in the erecting of the blank within the closing mold assembly 130. However, one or more of the score lines (e.g., fold lines 28, 32, 38) could be omitted from the blank 22, in which case it may be necessary to close the mold assembly relatively slowly, in an effort to ensure that the blank is properly erected therein. For example, the flat blank 22 schematically shown in FIGS. 8A and 9 could completely lack fold/score lines. That is, a variety of different blanks are within the scope the scope of the present invention. Likewise, a variety of different mold assemblies are within the scope of the present invention. Therefore, a variety of different constructs (e.g., blanks, trays, cartons and other containers) are also within the scope of the present invention.

Figure 12:
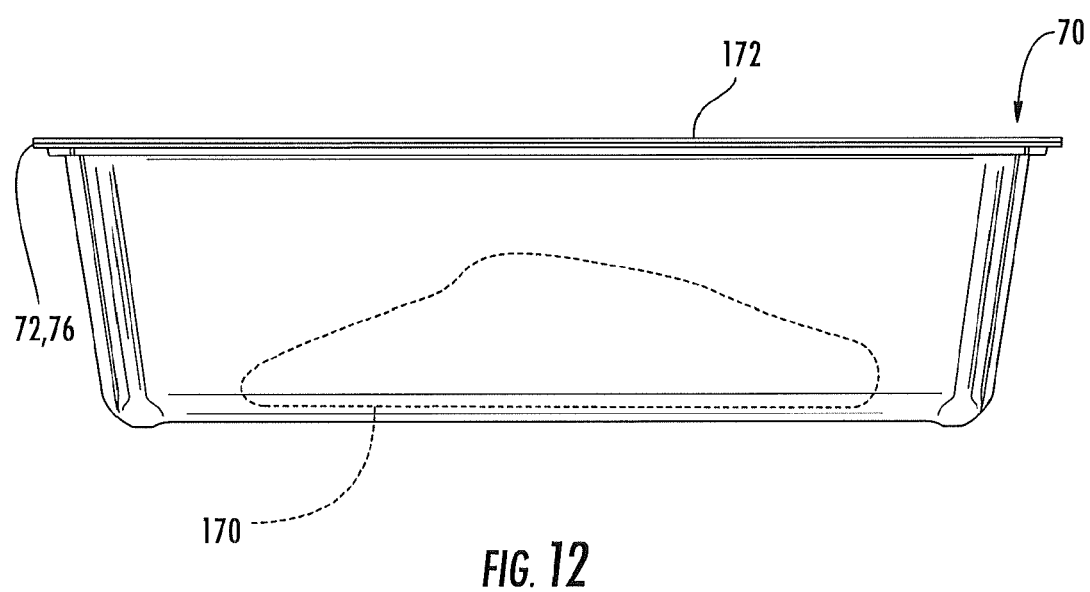
FIG. 12 schematically illustrates the tray of FIG. 3 containing food and closed with a polymer film, in accordance with the first embodiment.

In accordance with the first embodiment, after the tray 70 is formed, food can be placed in the tray's cavity, and then the tray's opening can be closed in a leakproof manner, such as with a cover in the form of a polymeric overwrap that can be advantageously heat sealed to the flat upper surface of the band 76 of the frame 72. For example, FIG. 12 schematically illustrates the tray 70 of FIG. 3 containing food 170 and closed with a polymer film 172 that is heat sealed to the substantially flat, upwardly facing surface of the band 76 of the frame 72. FIG. 12 is schematic because the food 170, which is hidden from view, is shown by dashed lines, and the thickness of the overwrap/polymer film 172 that closes the tray 70 is exaggerated. Alternatively, the tray 70 can be closed with lids made of paperboard, foil or any other suitable material. A variety of mechanisms for closing the opening of the tray 70, such as in a leakproof manner, are within the scope of the present invention.

Referring back to FIG. 11B, it schematically illustrates a line of engagement 180 that exists between the outer mold 136 and nose unit 138 of the male mold 132. The line of engagement 180 may in some situations result in the formation of parting lines (not shown) in the corner elements 74 of the polymeric frame 72, with the parting lines corresponding with/being in opposing face-to-face contact with the respective portions of the line of engagement 180 while the mold assembly 130 is closed. The parting lines are optional and may be omitted.

Figure 13:
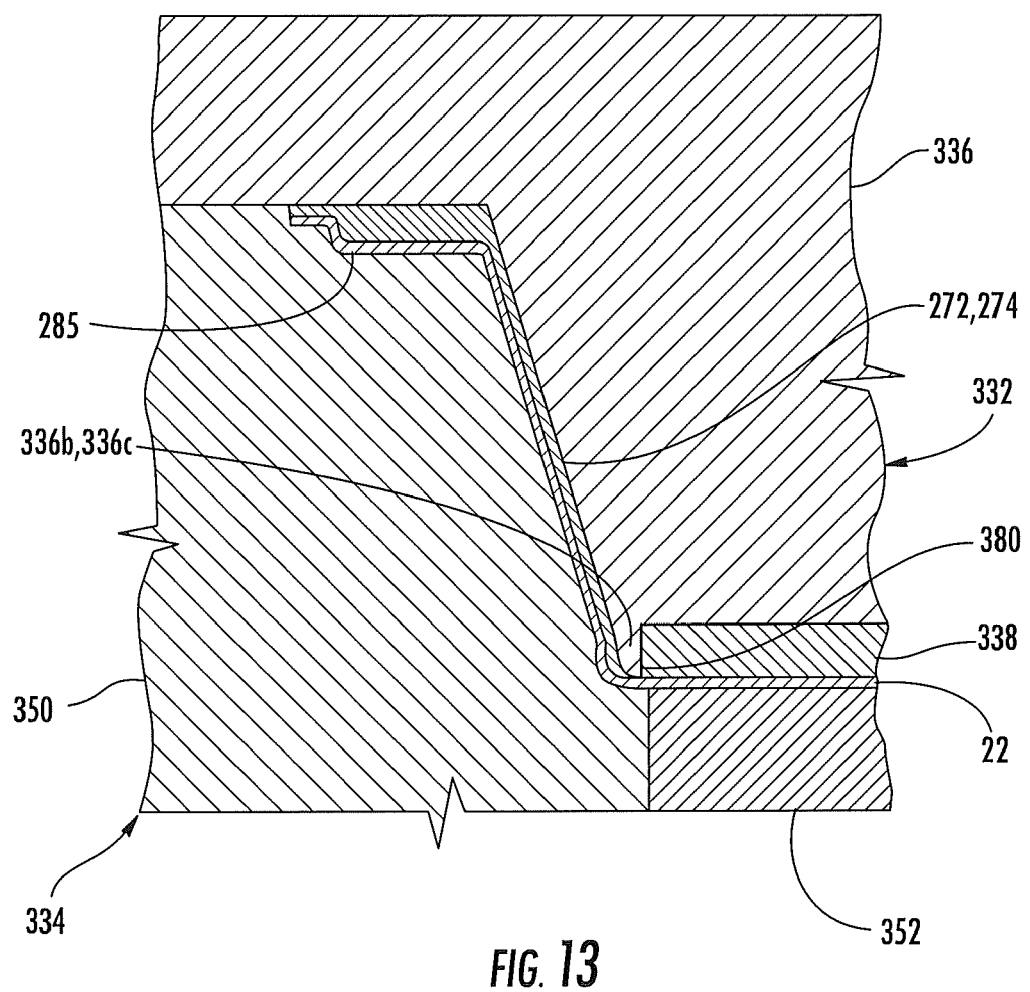
FIG. 13 is similar to FIG. 11B, except that it is for a second exemplary embodiment of the present invention.

FIG. 13 schematically illustrates a line of engagement 380 that exists between an outer mold 336 and nose unit 338 of a male mold 332 of a second exemplary embodiment of the present invention. The second embodiment is like the first embodiment, except for variations noted and variations that will be apparent to those of ordinary skill in the art. Therefore, reference characters for elements of the second embodiment that are at least generally like elements of the first embodiment are the same, except that they are incremented by two hundred.

FIG. 13 is like FIG. 11B, except, for example, that in FIG. 13 an entire length of the representative corner element 274 of the polymeric frame 272 is shown, and the male mold 332 of the second embodiment has been substituted so that the line of engagement 380 between the male outer mold 336 and the nose unit 338 is located in a manner that seeks to prevent formation of a parting line in the corner element 274. That is, the line of engagement 380 between the male outer mold 336 and the nose unit 338 typically will not cause a parting line in the corner elements 274 of the polymeric frame 272 of the second embodiment. Also, the securing pin 144 has been omitted from FIG. 13, for example since the securing pins 144 are optional and may typically be omitted. Alternatively, the securing pins could be included in the second embodiment.

FIG. 13 illustrates the fully closed mold assembly 330, in accordance with the second embodiment. In this fully closed configuration of the second embodiment: the male mold 332 extends into the cavity of the female mold 334; the lines of engagement 380 between the male outer mold 336 and the nose unit 338 of the male mold are distant from all parts of the polymeric frame 272 in a manner that seeks to avoid the formation of parting lines; the nose unit 338 of the male mold is in a retracted configuration with respect to the male outer mold 336; and the embossing unit 352 of the female mold 334 is in a retracted configuration with respect to the female outer mold 350.

Figure 14:
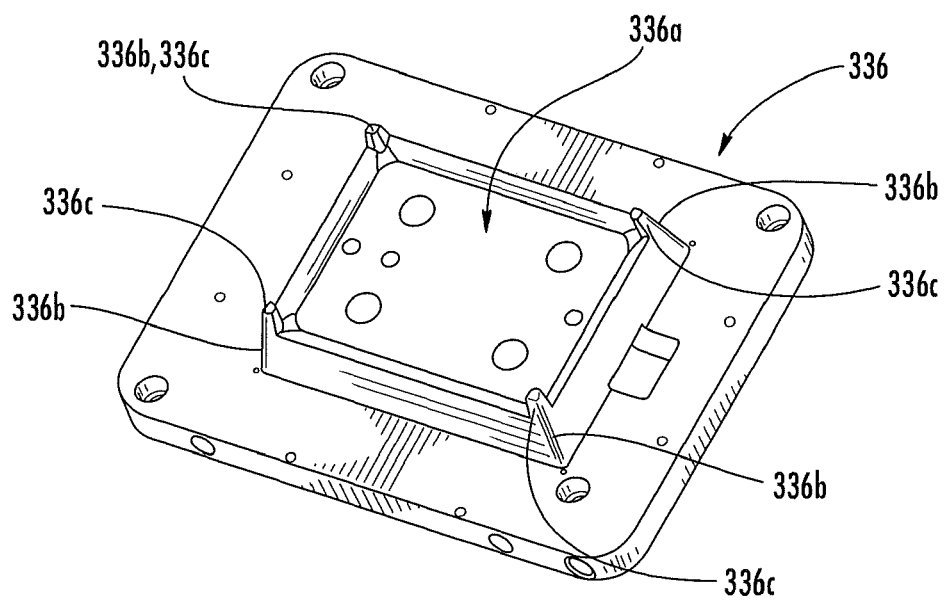
FIG. 14 is an isolated pictorial view of an outer mold of a male mold, in accordance with the second embodiment.

FIG. 14 is an isolated pictorial view of the male outer mold 336 in accordance with the second embodiment. The male outer mold 336 includes a central cavity 336a, corners 336b, and projections 336c that extends the corners.

Figure 15:
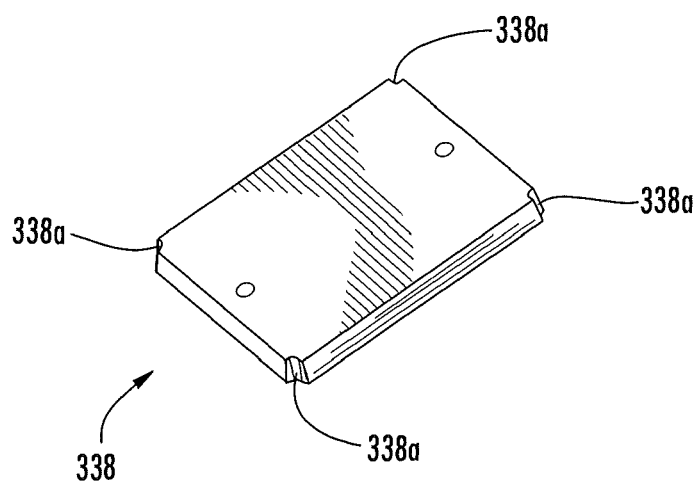
FIG. 15 is an isolated pictorial view of a nose unit of the male mold of the second embodiment.

FIG. 15 is an isolated pictorial view of the nose unit 338 (e.g., inner mold) of the male mold 332 in accordance with the second embodiment. The nose unit 338 includes corners with recesses 338a for respectively being in receipt of the projections 336c of the male outer mold 336 during the retracted configuration.

As with the first embodiment, the nose unit 338 of the second embodiment is movably mounted to the male outer mold 336 for moving between an extended configuration and a retracted configuration. Exemplary aspects of the mold assembly 330 of the second embodiment being in its closed configuration, which is shown in FIG. 13 and includes the nose unit 338 being in its retracted configuration, are described in the following. The nose unit 338 is at least partially within the cavity 336a of the male outer mold 336 so that the projections 336c of the male outer mold 336 are respectively positioned in the recessed corners 338a of the nose unit 338, so that the projections 336c extend at least partially around the nose unit 338. As a result, the corners 336b/projections 336c of the male outer mold 336 are respectively positioned between the nose unit 338 and the interior corners of the female outer mold 350 (e.g., see FIG. 9, which shows that each of the interior corners of the female outer mold 150 includes a central region 166 between elongate indentations 162). As best understood with reference to FIG. 13, the channels, which are for having the molding material (e.g., fluid polymeric material) flow therein during the forming of the corner elements 274 of the polymeric frame 272 are therefore defined solely between the corners 336b/projections 336c of the male outer mold 336 and the interior corners of the outer mold 350 (i.e., between the corners 336b/projections 336c and those portions of the blank 22 that are in the interior corners of the outer mold 350). In FIG. 13, the representative corner element 274 that is shown is schematically representative of one of the injection-molding channels that is defined between the corners 336b/projections 336c and the portion of the blank 22 in the respective interior corner of the outer mold 350.

Figure 16:
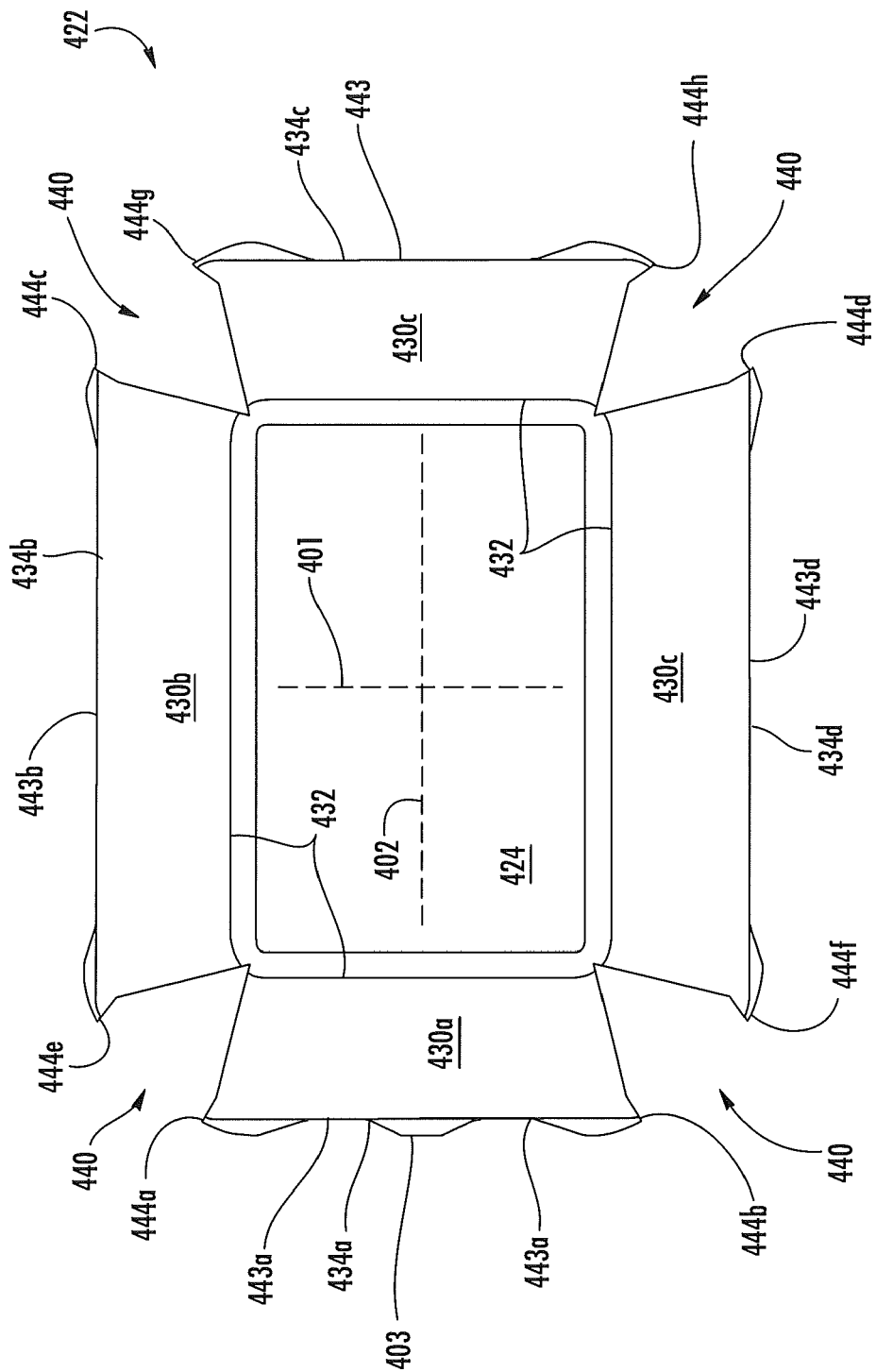
FIG. 16 is a schematic plan view of blank in a flat configuration, in accordance with a third exemplary embodiment of the present invention.

FIG. 16 illustrates a blank 422 according to a third embodiment of the present invention. The third embodiment can be like each of the first and second embodiments, except for variations noted and variations that will be apparent to those of ordinary skill in the art. Reference characters for elements of the third embodiment that are at least generally like elements of the first embodiment are the same, except that they are incremented by four hundred.

The blank 422 includes flaps/side panels 430a-430d that are foldably connected to a base panel 424, such as at fold line(s) 432. The flaps/side panels 430a-430d respectively include protruding features 444a-444h which respectively protrude into the corner gaps 440. The longer protruding features 444e, 444f, 444g, 444h are longer than the shorter protruding features 444a, 444b, 444c, 444d for facilitating the above-discussed predetermined overlapping of the protruding features in a tray (e.g., tray 70).

In addition, the protruding features 444a, 444b, 444g, 444h protrude away from a latitudinal axis 401 of the blank 422. This protruding can help to facilitate proper positioning of the flange portions 434a, 434c in the closed mold assembly 130. This protruding is defined by end sections of the edges 443a, 443c of the flaps/side panels 430a, 430c. In this regard, for each end section of the edges 443a, 443c, a first portion of the end section extends obliquely to, and away from, the latitudinal axis 401, and an adjacent second portion of the end section extends obliquely to, and toward, the latitudinal axis 401.

Similarly, the protruding features 444c, 444d, 444e, 444f protrude away from a longitudinal axis 402 of the blank 422. This protruding can help to facilitate proper positioning of the flange portions 434b, 434d in the closed mold assembly 130. This protruding is defined by end sections of the edges 443b, 443d of the flaps/side panels 430b, 430d. In this regards, for each end section of the edges 443b, 443d, a first portion of the end section extends obliquely to, and away from, the longitudinal axis 402, and an adjacent second portion of the end section extends obliquely to, and toward, the longitudinal axis 402.

Also, the flap/side panel 430a includes a central protruding feature 403 that helps to facilitate proper positioning of the flange portion 434a in the closed mold assembly 130, so that the flange portion 434a/protruding feature 403 is positioned adjacent to the port 146 (FIG. 8A) through which molding material is injected into the closed mold assembly 130 to form the frame 72, or the like.

Figure 17:
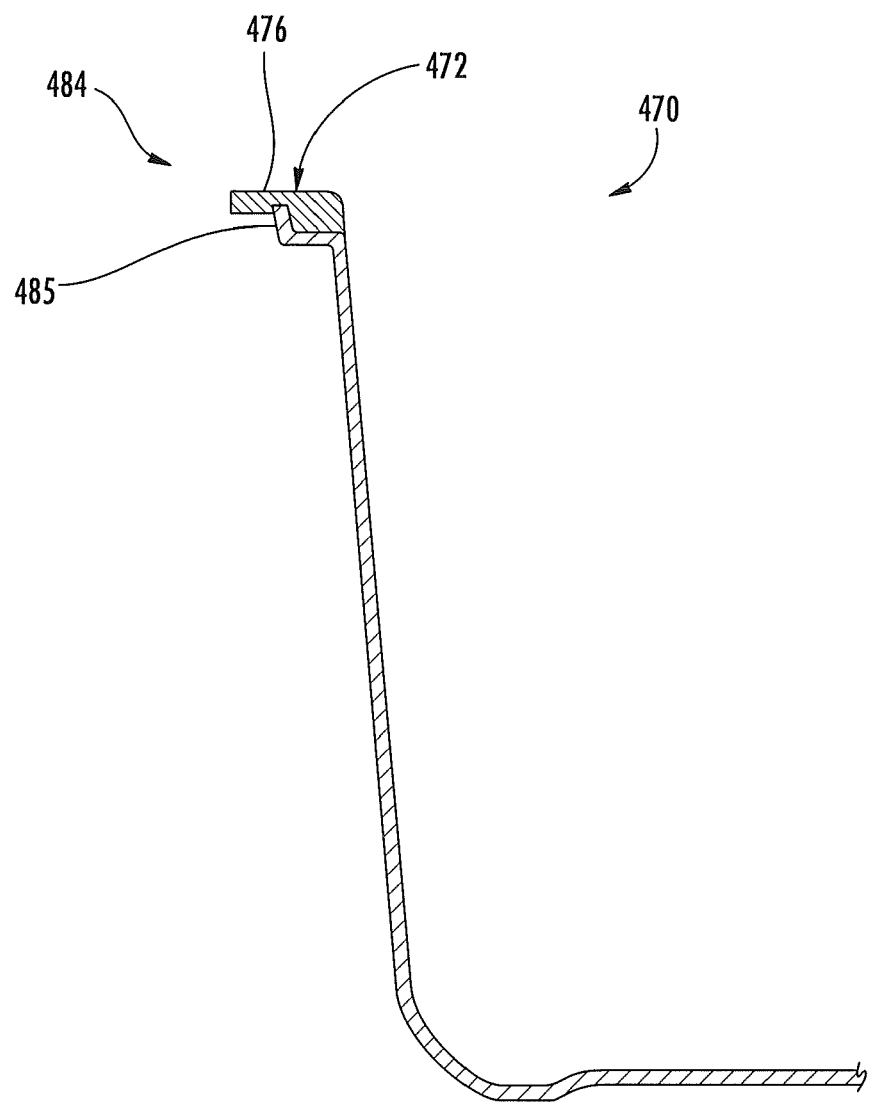
FIG. 17 is like FIG. 5, except, for example, that FIG. 17 is for the third embodiment.

FIG. 17 is schematic, and it is like FIG. 5, except that the cross section of FIG. 17 is taken through a tray formed from the blank 422 (FIG. 16), in accordance with the third embodiment. FIG. 17 is illustrative of cross sections taken distant from the outwardly protruding features 403, 444a-444h of the tray 470 of the third embodiment. In contrast, FIG. 5 is schematically illustrative of cross sections taken through the tray 470 of the third embodiment at locations that are proximate the outwardly protruding features 403, 444a-444h. In contrast to what is shown in FIG. 5, the multi-tiered rim 484 of the tray 470 of the third embodiment does not include the upper flange 83 (FIG. 5) in the areas that do not include the outwardly protruding features 403, 444a-444h, and a handle-shaped portion of the band 476 of the frame 472 takes the place of the omitted upper flange (e.g., upper flange 83 in FIG. 5). Similarly, the upright section 485 and other portions of the multi-tiered rim 484 may be omitted.

As mentioned above, the tray 70, is one example of a construct (e.g., container, sleeve or other construct) of the present invention. As alluded to above, any of the various constructs of the present invention may optionally include one or more features that alter the effect of microwave energy during the heating or cooking of a food item that is associated with the construct. For example, the construct may be formed at least partially from (e.g., the web 54 and/or layer of microwave interactive material 58 shown in FIGS. 2A and 2B can include) one or more microwave energy interactive elements (hereinafter sometimes referred to as "microwave interactive elements") that promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

The microwave interactive element may be supported on a microwave inactive or transparent substrate (e.g., such as, but not limited to, the paperboard 52 or polymer film 50 shown in FIGS. 2A and 2B) for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such constructs are referred to herein as "microwave interactive webs".

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymer film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In one example, the microwave interactive element may comprise a thin layer of microwave interactive material that tends to absorb microwave energy, thereby generating heat at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor". However, other microwave energy interactive elements, such as those described herein, are contemplated hereby.

As another for example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

The shielding element may be formed from various materials and may have various configurations, depending on the particular application for which the shielding element is used. Typically, the shielding element is formed from a conductive, reflective metal or metal alloy, for example, aluminum, copper, or stainless steel. The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil, such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments often act as a transmitting element to direct microwave energy to specific areas of the food item. Such foils also may be used in combination with browning and/or crisping elements, for example, susceptors.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The number, shape, size, and positioning of such breaks or apertures may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in the material used to form the construct, or may be a non-physical "aperture". A non-physical aperture may be a portion of the construct that is microwave energy inactive by deactivation or otherwise, or one that is otherwise transparent to microwave energy. Thus, for example, the aperture may be a portion of the construct formed without a microwave energy active material or, alternatively, may be a portion of the construct formed with a microwave energy active material that has been deactivated. While both physical and non-physical apertures allow the food item to be heated directly by the microwave energy, a physical aperture also provides a venting function to allow steam or other vapors to be released from the food item.

It also may be beneficial to create one or more discontinuities or inactive regions to prevent overheating or charring of the construct, for example, where two or more panels abut or overlap. When exposed to microwave energy, the concentration of heat generated by the abutted or overlapped panels may be sufficient to cause the underlying support, in this case, paperboard, to become scorched. As such, the abutting or overlapping portions of one or more panels may be designed to be microwave inactive, for example, by forming these areas without a microwave energy interactive material or by deactivating the microwave energy interactive material in these areas.

As stated above, any of the above elements and numerous others contemplated hereby may be supported on a substrate. The substrate typically comprises an electrical insulator, for example, a polymer film or material. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymer films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one example, the polymer film comprises polyethylene terephthalate (PET). Polyethylene terephthalate films are used in commercially available susceptors, for example, the QWIKWAVE® Focus susceptor and the MICRORITE® susceptor, both available from Graphic Packaging International (Marietta, Ga.). Examples of polyethylene terephthalate films that may be suitable for use as the substrate include, but are not limited to, MELINEX®, commercially available from DuPont Teijan Films (Hopewell, Va.), SKYROL, commercially available from SKC, Inc. (Covington, Ga.), and BARRIALOX PET, available from Toray Films (Front Royal, Va.), and QU50 High Barrier Coated PET, available from Toray Films (Front Royal, Va.).

The polymer film may be selected to impart various properties to the microwave interactive web, for example, printability, heat resistance, or any other property. As one particular example, the polymer film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, barrier polyethylene terephthalate, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, N.Y.). Additional examples include BARRIALOX PET, available from Toray Films (Front Royal, Va.) and QU50 High Barrier Coated PET, available from Toray Films (Front Royal, Va.), referred to above.

Still other barrier films include silicon oxide coated films, such as those available from Sheldahl Films (Northfield, Minn.). Thus, in one example, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 $cc/m^2/day$. In one aspect, the barrier film has an OTR of less than about 10 $cc/m^2/day$. In another aspect, the barrier film has an OTR of less than about 1 $cc/m^2/day$. In still another aspect, the barrier film has an OTR of less than about 0.5 $cc/m^2/day$. In yet another aspect, the barrier film has an OTR of less than about 0.1 $cc/m^2/day$.

The barrier film may have a water vapor transmission rate (WVTR) of less than about 100 $g/m^2/day$ as measured using ASTM F1249. In one aspect, the barrier film has a water WVTR as measured using ASTM F1249 of less than about 50 $g/m^2/day$. In another aspect, the barrier film has a WVTR of less than about 15 $g/m^2/day$. In yet another aspect, the barrier film has a WVTR of less than about 1 $g/m^2/day$. In still another aspect, the barrier film has a WVTR of less than about 0.1 $g/m^2/day$. In a still further aspect, the barrier film has a WVTR of less than about 0.05 $g/m^2/day$.

Other non-conducting substrate materials such as metal oxides, silicates, cellulosics, or any combination thereof, also may be used in accordance with the present invention.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683, each of which is incorporated by reference herein in its entirety. Although particular examples of patterns of microwave energy interactive material are shown and described herein, it should be understood that other patterns of microwave energy interactive material are contemplated by the present invention.

The microwave interactive element or microwave interactive web may be joined to or overlie a dimensionally stable, microwave energy transparent support (hereinafter referred to as "microwave transparent support", "microwave inactive support" or "support") to form the construct.

In one aspect, for example, where a rigid or semi-rigid construct is to be formed, all or a portion of the support may be formed at least partially from a paperboard material, which may be cut into a blank prior to use in the construct. For example, the support may be formed from paperboard having a basis weight of from about 60 to about 330 lbs/ream (i.e., lbs/3,000 ft$^2$), for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

In another aspect, where a more flexible construct is to be formed, the support may comprise a paper or paper-based material generally having a basis weight of from about 15 to about 60 lbs/ream, for example, from about 20 to about 40 lbs/ream. In one particular example, the paper has a basis weight of about 25 lbs/ream.

Optionally, one or more portions of the various blanks (e.g., the substrate, or more specifically the paperboard 52 which is formed from cellulosic material) or other constructs described herein or contemplated hereby may be coated with varnish, clay, or other materials, either alone or in combination. The coating may then be printed over with product advertising or other information or images. The blanks or other constructs also may be coated to protect any information printed thereon. Typically, the margin of the blank will not be coated or printed with ink or any other material that may have an adverse effect on the adhesion of the frame 72, or the like, to the blank. That is, ink will typically be omitted from the blank in the areas in which the blank and frame 72 overlap. Typically, any ink or microwave interactive materials are applied to the blank prior to forming the frame 72 onto the blank/construct/tray, although other sequences can be acceptable.

Furthermore, the blanks or other constructs may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, DuPont DARTEK™ nylon 6,6, and others referred to above.

Alternatively or additionally, any of the blanks or other constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. patent application Ser. No. 11/211,858, to Middleton, et al., titled "Absorbent Microwave Interactive Packaging", filed Aug. 25, 2005, both of which are incorporated herein by reference in their entirety. Additionally, the blanks or other constructs may include graphics or indicia printed thereon.

It will be understood that with some combinations of elements and materials, the microwave interactive element may have a grey or silver color that is visually distinguishable from the substrate or the support. However, in some instances, it may be desirable to provide a web or construct having a uniform color and/or appearance. Such a web or construct may be more aesthetically pleasing to a consumer, particularly when the consumer is accustomed to packages or containers having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive element, using a dark toned substrate, for example, a black toned substrate, to conceal the presence of the silver or grey toned microwave interactive element, overprinting the metalized side of the web with a silver or grey toned ink to obscure the color variation, printing the non-metalized side of the web with a silver or grey ink or other concealing color in a suitable pattern or as a solid color layer to mask or conceal the presence of the microwave interactive element, or any other suitable technique or combination thereof.

As mentioned above, numerous differently configured constructs are within the scope of the present invention. As one last example, the tray 70 could be configured so that it includes multiple compartments, and the compartments can respectively include (or be associated with) microwave energy interactive material with different characteristics. More specifically, one of the compartments can include shielding elements, another compartment can include a susceptor, and another compartment can include a transmitting element. Other variations between compartments are also within the scope of the present invention.

In accordance with the exemplary embodiments of the present invention, the blanks can be formed from paperboard, corrugated cardboard or other materials having properties suitable for at least generally enabling respective functionalities described above. Paperboard is typically of a caliper such that it is heavier and more rigid than ordinary paper, and corrugated cardboard is typically of a caliper such that it is heavier and more rigid than paperboard. Typically, at least the side of the paperboard or cardboard that will be an exterior surface in the carton erected therefrom will be coated with a clay coating, or the like. The clay coating can be printed over with product, advertising, price-coding, and other information or images. The blanks may then be coated with a varnish to protect any information printed on the blanks. The blanks may also be coated with, for example, a moisture barrier layer, on one or both sides. The blanks can also be laminated to or coated with one or more sheet-like materials.

In accordance with the exemplary embodiments of the present invention, a fold line can be any at least somewhat line-like arranged, although not necessarily straight, form of weakening that facilitates folding therealong; and a tear line can be any at least somewhat line-like arranged, although not necessarily straight, form of weakening that facilitates tearing therealong. More specifically, but not for the purpose of narrowing the scope of the present invention, conventional fold lines include: a crease, such as formed by folding; a score line, such as formed with a blunt scoring knife, or the like, which creates a crushed portion in the material along the desired line of weakness; a slit that extends partially into the material along the desired line of weakness, and/or a series of spaced apart slits that extend partially into and/or completely through the material along the desired line of weakness; or various combinations of these features.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A container, comprising:
   a plurality of panels extending partially around an interior cavity of the container, wherein the plurality of panels includes first and second panels that together partially define an upright elongate corner of the container, an upright elongate gap is defined between at least a portion of an upright edge of the first panel and at least a portion of an upright edge of the second panel, and for each of the first and second panels the panel includes a curved portion proximate to the gap,
an outward surface of the curved portion of the panel defines an outwardly projecting protrusion of the panel,
the outwardly projecting protrusion of the panel is elongate, proximate to the gap, and extends upwardly along both the gap and the corner, and
an inward surface of the curved portion of the panel defines a recess that is elongate and extends upwardly along both the gap and the corner; and an injection-molded strip extending upwardly along and partially defining the corner of the container, wherein the injection-molded strip covers the gap,
the injection-molded strip includes an upwardly extending inner face that partially defines the cavity of the container, the inner face being smoothly curved from the first panel to the second panel, wherein the inner face being smoothly curved from the first panel to the second panel comprises both the inner face extending concavely from the first panel to the second panel, and
the inner face extending smoothly from the first panel to the second panel, the injection-molded strip further includes an outwardly projecting first protrusion that is elongate, extends upwardly along both the corner and the gap, and extends outwardly into the recess of the curved portion of the first panel,
the injection-molded strip further includes an outwardly projecting second protrusion that is elongate, extends upwardly along both the corner and the gap, and extends outwardly into the recess of the curved portion of the second panel,
the injection-molded strip further includes a bead that extends into the gap and is positioned between the first and second protrusions of the injection-molded strip, and
for each of the first and second protrusions, the protrusion extends outwardly from the smoothly curved inner face of the injection-molded strip, so that the protrusion is thicker than an adjacent portion of the injection-molded strip.

2. The container according to claim 1, wherein:
the plurality of panels includes a curved portion,
an outward surface of the curved portion of the plurality of panels defines an outwardly projecting protrusion of the plurality of panels,
an inward surface of the curved portion of the plurality of panels defines a recess, and
the injection-molded strip further includes an outwardly projecting third protrusion that extends into the recess of the curved portion of the plurality of panels.

3. The container according to claim 2, wherein:
the outwardly projecting protrusion of the plurality of panels is an outwardly bulbous portion of the plurality of panels;
the recess of the plurality of panels is a substantially bowl-shaped recess;
the third protrusion of the injection-molded strip is an outwardly bulbous portion of the injection-molded strip that extends into the substantially bowl-shaped recess; and
the outwardly bulbous portion of the plurality of panels and the outwardly bulbous portion of the injection-molded strip are positioned at a lower end of the corner.

4. The container according to claim 3, wherein the gap extends into the outwardly bulbous portion of the plurality of panels.

5. The container according to claim 3, wherein:
at least one panel of the plurality of panels comprises microwave energy interactive material, paperboard and polymer film,
the microwave energy interactive material is positioned between the paperboard and the polymer film, and
at least a portion of the injection-molded strip is adhered to the polymer film.

6. The container according to claim 1, wherein a bulbous portion is proximate an end of the corner.

7. The container according to claim 1, wherein:
at least one panel of the plurality of panels comprises microwave energy interactive material, paperboard and polymer film,
the microwave energy interactive material is positioned between the paperboard and the polymer film, and
at least a portion of the injection-molded strip is adhered to the polymer film.

8. The container according to claim 1, wherein the injection-molded strip is injection-molded onto both the first panel and the second panel.

9. The container according to claim 1, wherein:
the plurality of panels includes a curved portion;
an outward surface of the curved portion of the plurality of panels defines an outwardly bulbous portion of the plurality of panels;
an inward surface of the curved portion of the plurality of panels defines a substantially bowl-shaped recess;
the injection-molded strip further includes an outwardly bulbous portion that extends into the substantially bowl-shaped recess;
the outwardly bulbous portion of the plurality of panels and the outwardly bulbous portion of the injection-molded strip are positioned at a lower end of the corner; and
the protrusion of the first panel and the first protrusion of the injection-molded strip respectively extend upwardly from the outwardly bulbous portion of the plurality of panels and the outwardly bulbous portion of the injection-molded strip.

10. The container according to claim 1, wherein:
the protrusion of the first panel is convex;
the first protrusion of the injection-molded strip is convex; and
the recess of the first panel is concave.

11. The container according to claim 1, wherein the curved portion of the first panel is not pleated.

12. The container according to claim 1, wherein:
the corner includes an elongate centerline that extends along the corners' length; and
the centerline is spaced apart from each of
the protrusion of the first panel,
the first protrusion of the injection-molded strip, and
the recess of the first panel.

13. The container according to claim 1, wherein:
the outwardly projecting protrusion of the first panel is press-formed by the outwardly projecting first protrusion of the injection-molded strip, and the outwardly projecting protrusion of the second panel is press-formed by the outwardly projecting second protrusion of the injection-molded strip.

14. A container, comprising:
a plurality of panels that partially defines an interior cavity of the container, wherein the plurality of panels includes a first panel and a second panel that is proximate to the first panel and together with the first panel partially defines an upright corner of the container, and for each of the first and second panels
the panel includes a curved portion,
an outward surface of the curved portion of the panel defines an outwardly projecting protrusion of the panel,
the outwardly projecting protrusion of the panel is elongate and extends upwardly along the corner, and
an inward surface of the curved portion of the panel defines a recess that is elongate and extends upwardly along the corner; and
an injection-molded strip extending upwardly along and partially defining the corner of the container, wherein
the injection-molded strip includes an upwardly extending inner face that partially defines the cavity of the container, the inner face being smoothly curved from the first panel to the second panel, wherein the inner face being smoothly curved from the first panel to the second panel comprises both
the inner face extending concavely from the first panel to the second panel, and
the inner face extending smoothly from the first panel to the second panel,
the injection-molded strip further includes an outwardly projecting first protrusion that is elongate, extends upwardly along the corner, and extends outwardly into the recess of the curved portion of the first panel,
the injection-molded strip further includes an outwardly projecting second protrusion that is elongate, extends upwardly along the corner, and extends outwardly into the recess defined by the curved portion of the second panel, and
the corner includes an elongate centerline that extends along the corners' length, and the centerline is spaced apart from each of
the protrusion of the first panel,
the first protrusion of the injection-molded strip, and
the recess of the first panel, and
for each of the first and second protrusions, the protrusion extends outwardly from the smoothly curved inner face of the injection-molded strip, so that the protrusion is thicker than an adjacent portion of the injection-molded strip.

15. The container according to claim 14, wherein:
a gap is defined between at least a portion of an edge of the first panel and at least a portion of an edge of the second panel;
the injection-molded strip includes an outwardly projecting third protrusion that is elongate, extends along the corner, and extends into the gap; and
the third protrusion of the injection-molded strip is positioned between the first and second protrusions of the injection-molded strip.

16. The container according to claim 14, wherein:
the outwardly projecting protrusion of the first panel is press-formed by the outwardly projecting first protrusion of the injection-molded strip, and
the outwardly projecting protrusion of the second panel is press-formed by the outwardly projecting second protrusion of the injection-molded strip.

17. The container according to claim 14, wherein:
the protrusion of the first panel is convex;
the first protrusion of the injection-molded strip is convex; and
the recess of the first panel is concave.

* * * * *